(12) United States Patent
Kim et al.

(10) Patent No.: US 8,169,802 B2
(45) Date of Patent: May 1, 2012

(54) SWITCH CONTROLLER OF A CONVERTER WITH A SOFT START SIGNAL GENERATOR COMPRISING A PLURALITY OF CURRENT SOURCES

(75) Inventors: Jin-Tae Kim, Bucheon (KR); Gwan-Bon Koo, Bucheon (KR); Hang Seok Choi, Gunpo (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 975 days.

(21) Appl. No.: 12/150,226

(22) Filed: Apr. 25, 2008

(65) Prior Publication Data

US 2008/0266907 A1    Oct. 30, 2008

(30) Foreign Application Priority Data

Apr. 25, 2007    (KR) .................. 10-2007-0040242

(51) Int. Cl.
    *H02M 1/36*    (2007.01)

(52) U.S. Cl. ............. 363/49; 323/288; 323/901
(58) Field of Classification Search ............ 363/49, 363/21.01, 21.15, 21.18; 323/288, 901
    See application file for complete search history.

(56) References Cited

U.S. PATENT DOCUMENTS

| 6,633,193 | B1 | 10/2003 | Halamik et al. |
| 7,088,078 | B2 * | 8/2006 | Liu ................. 323/207 |
| 7,579,784 | B2 * | 8/2009 | Araki et al. .......... 315/209 R |
| 7,928,715 | B2 * | 4/2011 | Shibata ............ 323/288 |
| 2007/0030709 | A1 * | 2/2007 | Kitagawa ........... 363/49 |

* cited by examiner

*Primary Examiner* — Harry Behm
(74) *Attorney, Agent, or Firm* — Sidley Austin LLP

(57) ABSTRACT

Disclosed are a switch controller, a switch control method, a converter using the same, and a driving method thereof. A first voltage is generated by using a voltage that is input to an input terminal, and a soft start signal is generated by using the first voltage during a soft start duration. A switching operation is controlled by using the soft start signal during the soft start duration.

23 Claims, 14 Drawing Sheets

SWITCH CONTROLLER OF A CONVERTER WITH A SOFT START SIGNAL GENERATOR COMPRISING A PLURALITY OF CURRENT SOURCES

CROSS-REFERENCE TO RELATED APPLICATION

This application claims priority to and the benefit of Korean Patent Application No. 10-2007-0040242 filed in the Korean Intellectual Property Office on Apr. 25, 2007, the entire contents of which are incorporated herein by reference.

BACKGROUND

1. Field of the Invention

The present invention relates to a converter based on a soft start drive. In particular, the present invention relates to a switch controller for controlling a switching operation of a soft start type of converter, a switch control method, and a converter using the same, and a driving method thereof.

2. Description of the Related Art

In general, a converter uses a soft start method for preventing an over-current through a main switch controlling an output voltage in the initial operation of the converter and minimizing an output overvoltage. The soft start method controls the switching operation of the main switch of a converter to gradually increase an output voltage at the initial operation of the converter.

A digital to analog converter (DAC) and a counter with a large size and a complex structure are used so as to control the converter for soft-start in the conventional soft start method. Accordingly, the structure and the operation of the converter are typically complicated, and the components for the soft start operation occupy a large area in the converter. Further, the production cost of the converter is high since it uses a circuit with a large size and complexity.

The above information disclosed in this Background section is only for enhancement of understanding of the background of the invention and therefore it may contain information that does not form the prior art that is already known in this country to a person of ordinary skill in the art.

SUMMARY

Briefly and generally, embodiments of the present invention provide a switch controller having a simple structure and a reduced area, a switch control method, a converter using the same, and a driving method thereof.

In some embodiments, a switch controller of a converter for converting an input signal into an output signal according to a switching operation by a switch includes: a soft start signal generator for generating a first voltage by using the input signal, and generating a soft start signal that is increased for a predetermined duration from the converter's initial operation; and a PWM controller for controlling the switching operation of the switch by using a current flowing to the switch and a signal that is a lesser one between the feedback signal and the soft start signal. The soft start signal generator includes: a voltage level detector for detecting a level of the first voltage, and controlling the soft start signal to be increased each time the first voltage reaches a predetermined level; and a current source array unit for increasing the soft start signal by outputting a corresponding first current of a first current source from among a plurality of current sources according to the detected level of the first voltage. The switch controller further includes a negative slope detector for sensing a feedback signal that is variable by the output signal, and detecting a time when the feedback signal is reduced. The negative slope detector outputs a soft start finish signal when sensing that the feedback signal is reduced. The negative slope detector includes: a diode having an anode for receiving the feedback signal; a capacitor having a first terminal connected to a cathode of the diode; a switching element having a first electrode connected to a first terminal of the capacitor and a second electrode connected to a second terminal of the capacitor, and resetting the capacitor at an initial operation time of the converter; a comparator having an inverting terminal connected to the anode of the diode and a non-inverting terminal connected to the cathode thereof; and a flip-flop having a first terminal connected to an output terminal of the comparator and a first output terminal for outputting a signal in response to the output of the comparator, and being reset at the initial operation time of the converter. The voltage level detector compares the first voltage and at least two step voltages, and adds a first current that corresponds to the step voltage from among a plurality of current sources of the current source array unit to the soft start signal. The voltage level detector includes a first comparator for comparing the first voltage and the first step voltage from among the at least two step voltages, and a logical operator for comparing the soft start finish signal and a signal that is output by the first comparator according to the comparison result. The first comparator outputs a high-level signal when the first voltage is greater than the first step voltage, the soft start finish signal is a high level, and the logical operator performs an OR operation. The soft start signal generator includes a voltage level detector for detecting the first voltage, and a voltage shifter that is enabled and disabled according to a level of the first voltage for generating the soft start signal during a first duration including a soft start duration. The voltage shifter starts its operation when the first voltage becomes the first level, and when the first voltage becomes a second level that is greater than the first level, the voltage shifter maintains and outputs the soft start signal at the time when the first voltage becomes the second level. The negative slope detector outputs a soft start finish signal when sensing that the feedback signal is reduced. The voltage shifter changes the soft start signal to a level that is greater than the feedback signal and outputs the resultant signal when the soft start finish signal is input. The negative slope detector includes: a diode having an anode for receiving the feedback signal; a capacitor having a first terminal connected to a cathode of the diode; a switching element having a first electrode connected to a first terminal of the capacitor and a second electrode connected to a second terminal of the capacitor, and resetting the capacitor at an initial operation time of the converter; a comparator having an inverting terminal connected to the anode of the diode and a non-inverting terminal connected to the cathode thereof; and a flip-flop having a first terminal connected to an output terminal of the comparator and a first output terminal for outputting a signal in response to the output of the comparator, and being reset at the initial operation time of the converter. The switch and the switch controller are formed into a chip. The switch and the switch controller may be formed into separate chips, and each chip is formed into a package or packages.

In some embodiments, a switch controller for controlling operation of a converter by a soft start method at an initial operation by using a feedback signal that corresponds to an output signal of the converter includes: a diode having an anode for receiving the feedback signal; a capacitor having a first terminal connected to a cathode of the diode; a switching element having a first electrode connected to a first terminal of the capacitor and a second electrode connected to a second terminal of the capacitor, and resetting the capacitor at an initial operation time of the converter; a comparator having an inverting terminal connected to the anode of the diode and a non-inverting terminal connected to the cathode thereof; and a flip-flop having a first terminal connected to an output terminal of the comparator and a first output terminal for outputting a signal in response to the output of the comparator, and being reset at the initial operation time of the converter.

In some embodiments, a switch controlling method by a converter for converting an input signal into an output signal according to a switching operation by the switch includes: generating a first voltage by using the input signal; generating a soft start signal according to a level of the first voltage; controlling the switch by using a lesser one between the soft start signal and a feedback signal that corresponds to the output signal; and finishing the soft start by detecting the time when the feedback signal is reduced. The first voltage is increased for a predetermined duration starting from the initial operation. The soft start signal is increased as the level of the first voltage is increased, and when the first voltage reaches the first level, the soft start signal becomes a second level that is greater than the peak value of the feedback signal. The soft start signal is synchronized with the time when the feedback signal is reduced and a negative slope of the feedback signal is sensed, and becomes the second level.

In some embodiments, a converter includes: a switch; an energy transfer element for converting input energy into output energy according to a switching operation by the switch; and a switch controller for generating a first voltage by using the input energy, generating a soft start signal according to the first voltage during a soft start duration, and controlling the switching operation of the switch by using the soft start signal, a feedback voltage corresponding to the output energy, and a current flowing to the switch. The switch controller includes: a voltage level detector for detecting a level of the first voltage, and controlling the soft start signal to be increased each time the first voltage reaches a predetermined level; a current source array unit for generating the soft start signal by outputting a corresponding first current of a first current source from among a plurality of current sources according to the detected level of the first voltage; and a negative slope detector for stopping the soft start when sensing a negative slope of the feedback voltage waveform. The converter includes a feedback signal generator for receiving the feedback voltage and the soft start signal and generating a feedback signal, and a PWM controller for controlling the switching operation of the switch by using the feedback signal and the sense voltage during the soft start duration. The feedback signal generator includes: a first diode having a cathode connected to a capacitor for generating the feedback voltage; a second diode having an anode connected to an anode of the first diode; a first resistor having a first terminal connected to a cathode of the second diode; and a second resistor having a first terminal connected to a second terminal of the first resistor, and a grounded second terminal. The soft start signal includes a second current generated by at least one of the first current sources and a third current generated by another of the first current sources, the third current is transmitted to the capacitor, and the second current is transmitted to a node where each the anode of the first diode and the anode of the second diode is connected. The converter includes a high voltage regulator for generating the first voltage by using an input voltage of the input energy, and an undervoltage lockout unit for stopping an operation of the switch controller when sensing that a level of the first voltage is less than a predetermined level. The voltage level detector compares the first voltage and at least two step voltages, and outputs a first current of the current source, that corresponds to the step voltage from among a plurality of current sources of the current source array unit, to the feedback signal generator. The voltage level detector includes a first comparator for comparing the first voltage and the first step voltage from among the at least two step voltage, and a logical operator for comparing a signal that is output by the first comparator according to the comparison result and a soft start finish signal for finishing the soft start by the negative slope detector. The first comparator outputs a high-level signal when the first voltage is greater than the first step voltage, the soft start finish signal is a high level, and the logical operator performs an OR operation. The current source array unit includes a current source switch that is turned on to control the first current to flow when the first voltage is greater than the first step voltage from among the at least two step voltages. One of the current source switches is connected between the current source for generating the lowest current from among the current sources and the cathode of the first diode, and first terminals of the other switches from among the current source switches are connected to a plurality of current sources and second terminals thereof are connected to the node The negative slope detector compares the reduced feedback voltage and the feedback voltage before reduction to detect a negative slope of the feedback voltage, and generates a soft start finish signal to the voltage level detector when the feedback voltage is reduced as the output voltage of the output energy reaches its rated value. The negative slope detector includes: a first diode having an anode for receiving the feedback signal; a capacitor having a first terminal connected to a cathode of the first diode; a switching transistor having a first electrode connected to a second terminal of the capacitor, a second electrode connected to the cathode of the first diode, and a control electrode for receiving a reset signal for resetting the switch controller; a comparator having an inverting terminal for receiving the feedback voltage and a non-inverting terminal connected to a first terminal of the capacitor; and a flip-flop having a reset terminal for receiving the reset signal and a set terminal for receiving an output signal of the comparator, and generating the soft start finish signal according to the reset signal and the comparator's output signal. The current source array unit includes a plurality of current sources, outputs currents of the current sources according to a level of the first voltage, and outputs the currents of the current sources corresponding to the soft start finish signal. The switch controller includes: a voltage level detector for detecting the first voltage; a voltage shifter being enabled and disabled according to the detection result of the voltage level detector, and generating the soft start signal during a first duration including a soft start duration; and a PWM controller for controlling the switching operation by comparing the soft start signal and a sense voltage that corresponds to the current flowing to the switch during the soft start duration. The voltage shifter starts its operation when the first voltage becomes the first level and it stops the operation when the first voltage becomes a second level that is greater than the first level, and it includes an amplifier for generating the soft start signal by amplifying a voltage difference between a second voltage that corresponds to the first voltage and a start voltage. The voltage level detector compares a first-level reference voltage and the first voltage and operates the voltage shifter when the first voltage is greater than the first-level reference voltage, and compares a second-level reference voltage that is greater than the first level and the first voltage and stops the voltage shifter when the first voltage is equal to the second-level reference voltage.

The PWM controller compares the sense voltage and a lesser one between the soft start signal and a feedback signal that corresponds to the feedback voltage to control the switching operation of the switch, and the soft start signal has a value that is greater than the peak value of the feedback signal when the soft start duration is finished. The converter includes: a first comparator for comparing the sense voltage and a lesser one between the soft start signal and the feedback signal; an oscillator for generating clock signals having a predetermined duration; and a flip-flop for receiving a signal caused by the comparison result by the first comparator and the clock signals, and generating a signal for turning off the switch when the sense voltage is equal to the lesser one between the soft start signal and the feedback signal. The converter further includes a negative slope detector for stopping the soft start when a negative slope of the feedback voltage waveform is sensed. When the feedback voltage is reduced as the output voltage of the output energy reaches its rated value, the negative slope detector compares the reduced feedback voltage and the feedback voltage before reduction to detect a negative slope of the feedback voltage, and generates a soft start finish signal to the voltage shifter. The voltage shifter generates a level of a soft start signal that is greater than the peak value of the feedback voltage according to the soft start finish signal. The negative slope detector includes: a first diode having an anode for receiving the feedback signal; a capacitor having a first terminal connected to a cathode of the first diode; a switching transistor having a first electrode connected to a second terminal of the capacitor, a second electrode connected to the cathode of the first diode, and a control electrode for receiving a reset signal for resetting the switch controller; a comparator having an inverting terminal for receiving the feedback voltage and a non-inverting terminal connected to a first terminal of the capacitor; and a flip-flop having a reset terminal for receiving the reset signal and a set terminal for receiving an output signal of the comparator, and generating the soft start finish signal according to the reset signal and the comparator's output signal. The energy transfer element is a transformer and the switch is connected to a primary side coil of the transformer, or the energy transfer element is an inductor and a first terminal of the switch is connected to the inductor.

In some embodiments, a method for driving a converter for converting input energy into output energy according to a switching operation by a switch includes: generating a first voltage by using the input energy; generating a soft start signal by using the first voltage and at least one reference voltage; controlling the switch by using the lesser one of the soft start voltage and the feedback voltage; and stopping the soft start by detecting the time when the feedback signal corresponding to the output energy is reduced. The generation of the soft start signal includes: sensing a level of the first voltage; comparing the sense result and a plurality of reference voltages; and increasing the level of the soft start signal each time the first voltage becomes equal to the plurality of reference voltages according to the comparison result. The first voltage is increased for a predetermined duration from the converter's initial operation time. The soft start signal is increased as the level of the first voltage is increased, and when the first voltage reaches the first level, the soft start voltage becomes a second level that is greater than the peak value of the feedback voltage. The soft start signal is synchronized with the time when the feedback signal corresponds to the output energy, and becomes the second level.

In some embodiments, a converter includes a signal generator for generating a first signal that is varied with reference to time by using an input signal of the converter for converting an input signal into an output signal, and a comparison unit for comparing the first signal and a plurality of step voltages to generate an output signal. The comparison unit includes at least two comparators corresponding to at least two step voltages. The comparators respectively receive the first signal through a non-inverting terminal, and the at least two step voltages through an inverting terminal. The converter generates a soft start finish signal by detecting a negative slope of the feedback voltage that corresponds to the output signal, and further includes at least two logical operators for receiving the soft start finish signal and corresponding to the comparator, and input terminals of the at least two logical operators are connected to output terminals of the at least two comparators.

DETAILED DESCRIPTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Through the specification, similar parts have similar reference number.

Throughout this specification and the claims that follow, when it is described that an element is "coupled" to another element, it means that the elements are "directly connected" and they may also be "electrically connected" with another element therebetween.

A switch controller, a converter including the same, and a switch control method will be described with reference to drawings.

Figure 1:
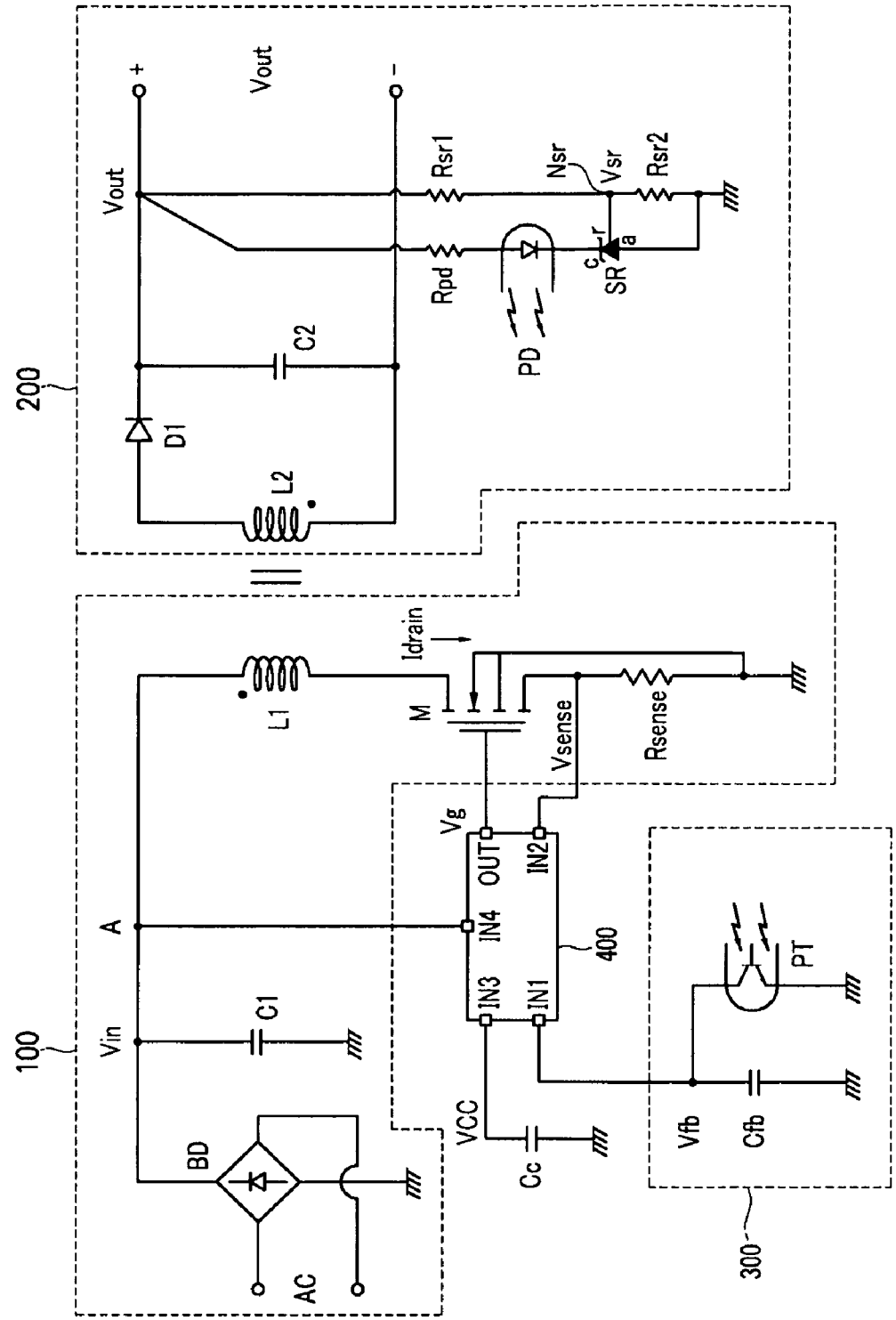
FIG. 1 shows a schematic diagram of a converter.

FIG. 1 shows a schematic diagram of a converter including a switch controller. The converter may include a power supply 100, an output unit 200, a feedback circuit 300, and a switch controller 400.

The power supply 100 may include a full wave bridge rectifier BD for rectifying an AC input (AC), a capacitor C1 for smoothing the rectified voltage, a primary side coil L1 of a transformer coupled to an input voltage Vin, a switch M coupled to the primary side coil L1 of the transformer, and a sense resistor Rsense. The switch M can be an n-type metal-oxide semiconductor field-effect transistor (MOSFET). The switch M has a gate electrode as a control electrode, and a drain electrode and a source electrode as two electrodes. The gate electrode of the switch M can be coupled to an output terminal OUT of the switch controller 400. The drain electrode of the switch M can be coupled to a first terminal of the primary side coil L1, and the source electrode can be coupled to a first terminal of the sense resistor Rsense. However, the switch M is not limited thereto, and can be realized by using another type of transistor. A first terminal of the sense resistor Rsense can be coupled to the source electrode of the switch M, and a second terminal thereof can be grounded. When the switch M is turned on, a sense voltage Vsense corresponding to the drain current Idrain flowing to the switch M is generated. The sense voltage Vsense can be generated by using a resistor so as to measure the drain current Idrain, but is not limited thereto, and a sensor for directly sensing the drain current Idrain can be used as well. The power supply 100 may receive the input voltage Vin and supply power to a secondary side coil L2 of the transformer according to the duty of the switch M so that a predetermined output voltage Vout may be output by the output unit 200. The converter may feed the output voltage Vout back, control the duty of the switch M of the power supply 100 by using the feedback value, and thereby regulate the output voltage Vout.

The output unit 200 may include a diode D1, a capacitor C2, a photodiode PD, a resistor Rpd, a shunt regulator SR, a resistor Rsr1, and a resistor Rsr2. An anode of the diode D1 can be coupled to the secondary side coil L2 of the transformer, and a first terminal of the capacitor C2 can be coupled to the output terminal (+) and a second terminal thereof can be coupled to the output terminal (−). A first terminal of the resistor Rpd can be coupled to the output terminal (+), and a second terminal thereof can be coupled to an anode of a photodiode PD. A cathode (c) of the shunt regulator SR can be coupled to a cathode of the photodiode PD, and an anode (a) thereof can be grounded. A first terminal of the resistor Rsr1 can be coupled to the output terminal (+) and the first terminal of the resistor Rpd, and a second terminal thereof can be coupled to a reference terminal (r) of the shunt regulator SR. A first terminal of the resistor Rsr2 can be coupled to the reference terminal (r) of the shunt regulator SR, and a second terminal thereof can be coupled to the anode (a) of the shunt regulator SR. A voltage Vsr at the node Nsr where the resistor Rsr1 and the resistor Rsr2 meet can be the reference voltage of the shunt regulator SR. While the switch M is turned on, power is stored in the primary side coil L1, and when the switch M is turned off, power of the primary side coil L1 may be transferred to the secondary side coil L2. When a certain voltage is generated in the secondary side coil L2, an output voltage Vout is charged in the capacitor C2, coupled in parallel to the secondary side coil L2. The voltage Vsr can increase according to the output voltage Vout and turn on the shunt regulator SR. This can cause a current to flow along a path of the resistor Rpd, the photodiode PD, and the shunt regulator SR. Accordingly, the photodiode PD may emit photons corresponding to the flowing current. A phototransistor PT of the feedback circuit 300 can form a photocoupler together with the photodiode PD. The phototransistor PT can sense the emitted photons and a current corresponding to the amount of sensed photons may flow through the phototransistor PT. The output unit 200 can supply power to the load and provide information corresponding to the output voltage Vout to the feedback circuit 300 so as to regulate the output voltage.

The feedback circuit 300 may include the phototransistor PT for forming the photocoupler together with the photodiode PD, and a capacitor Cfb coupled in parallel to the phototransistor PT. The photodiode PD may form the photocoupler together with the phototransistor PT of the feedback circuit 300 and provide information corresponding to the output voltage Vout to the feedback circuit 300. The phototransistor PT can be thought of as a dependent current source, since the current corresponding to the output voltage Vout of the output unit 200 flows through the phototransistor PT of the feedback circuit 300. When the output voltage Vout is great, a relatively large amount of current can flow through the phototransistor PT and the feedback voltage Vfb charging the capacitor Cfb can be reduced. When the output voltage Vout is low, a relatively small amount of current flows through the phototransistor PT and the feedback voltage Vfb charging the capacitor Cfb can be increased. Accordingly, information corresponding to the output voltage Vout can be sensed by the feedback circuit 300, input to the switch controller 400, and used to control the duty of the switch M.

The switch controller 400 may include a feedback voltage input terminal IN1, a sense voltage input terminal IN2, a first voltage input terminal IN3, a second voltage input terminal IN4, and an output terminal OUT. The switch controller 400 can receive the feedback voltage Vfb and a sense voltage Vsense through the two input terminals IN1 and IN2, respectively. The first voltage input terminal IN3 can be coupled to a capacitor Cc to receive a predetermined-level first voltage VCC that will be described later. The second voltage input terminal IN4 can be coupled to the power supply 100 to receive the input voltage Vin. The input voltage Vin can be set either by the voltage at the node A where the capacitor C1 of the power supply 100 is coupled to the primary side coil L1, or by the voltage at the node where the primary side coil L1 is coupled to the switch M. The switch controller 400 can be biased and start to operate by receiving the input voltage Vin, and control a soft start by using the first voltage VCC. The switch controller 400 can determine whether to turn off the switch M by using the sense voltage Vsense and the first voltage VCC during the soft start, which will now be described with reference to FIG. 2.

Figure 2:
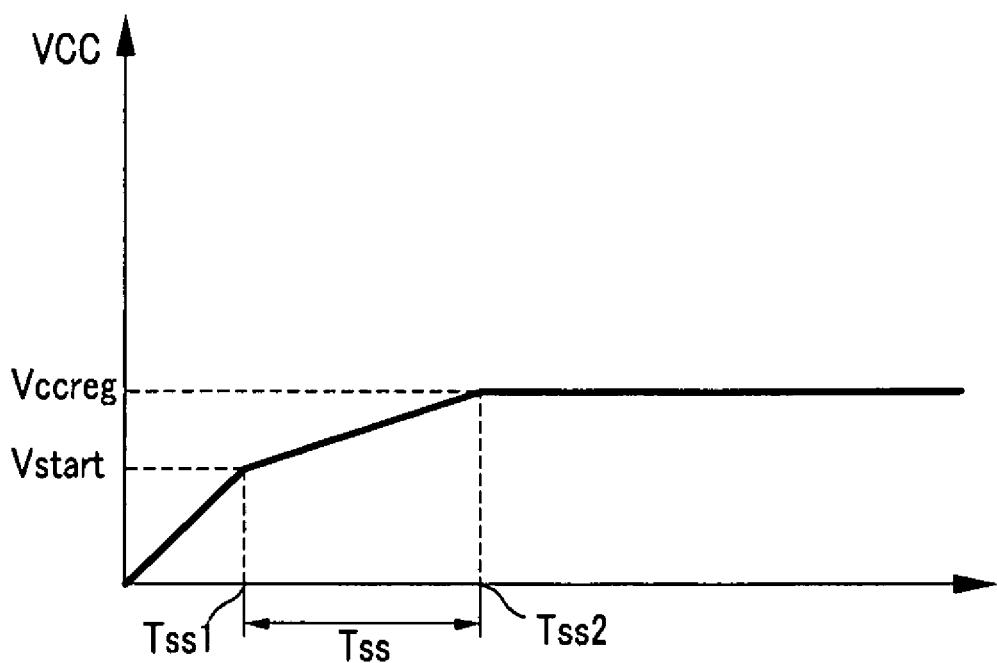
FIG. 2 shows a waveform of a first voltage VCC in the converter.

FIG. 2 shows a waveform of a first voltage VCC in a converter. In general, the output voltage Vout of the converter can be near 0 during its initial operation. The switch can be turned on for a long time within a minimum turn-on time that can be generated by a propagation delay time and a switch turn-off delay time so as to increase the output voltage Vout after its initial operation. An excess current may flow to the switch M during the minimum turn-on time, possibly damaging the switch M.

Such a damage can be pre-empted, for example, by a soft start method. The converter may use the first voltage VCC as a reference signal for the soft start method. In detail, as shown in FIG. 1, the switch controller 400 may charge the capacitor Cc by using the current source coupled to the second voltage input terminal IN4. While the capacitor Cc is charged, the first voltage VCC can increase with a predetermined slope. When the first voltage VCC reaches the start voltage Vstart at a time Tss1, required for an initial operation of the switch controller 400, a partial current of the current source can be used for the operation of the switch controller 400. At the time Tss1, the slope of the increasing first voltage VCC may decrease.

The first voltage VCC may reach a threshold voltage Vccreg, set by the user, at a time Tss2. After the time Tss2, the first voltage VCC can remain essentially equal to the threshold voltage Vccreg. The first voltage VCC increases from the start voltage Vstart to the threshold voltage Vccreg in the time interval Tss, the "soft start setting duration". A user can set the start voltage Vstart and the threshold voltage Vccreg to control the soft start setting duration. In detail, some conventional soft start methods determine whether to turn off the switch by using a step-like voltage that can be increased in a staircase manner. A height of each voltage step may provide a reference voltage level to be compared with the sense voltage. However, such methods often require the use of components such as a D/A converter and a counter having a large size and a complex structure so as to generate the step voltage. Instead, the present embodiments may us the first voltage VCC that rises with a predetermined slope, thus avoiding the need for a counter nor a D/A converter. Embodiments determine the soft start duration and whether to turn off the switch M during the soft start duration by using the first voltage VCC.

The switch controller 400 may receive the feedback voltage Vfb and the sense voltage Vsense, generate clock signals CLK having a predetermined period, and generate a gate control signal Vg for controlling the turning on and off of the switch M. The switch controller 400 can output the gate control signal Vg to the gate electrode of the switch M through the output terminal OUT. Hereinafter, the soft start setting duration and the soft start duration will be distinguished. The soft start duration can be a duration from the start of the operation to the time just before the output voltage reaches a rated value. Accordingly, the soft start duration TSS can be shorter than the soft start setting duration.

The switch controller 400 will be described with reference to FIG. 3 to FIG. 7.

Figure 3:
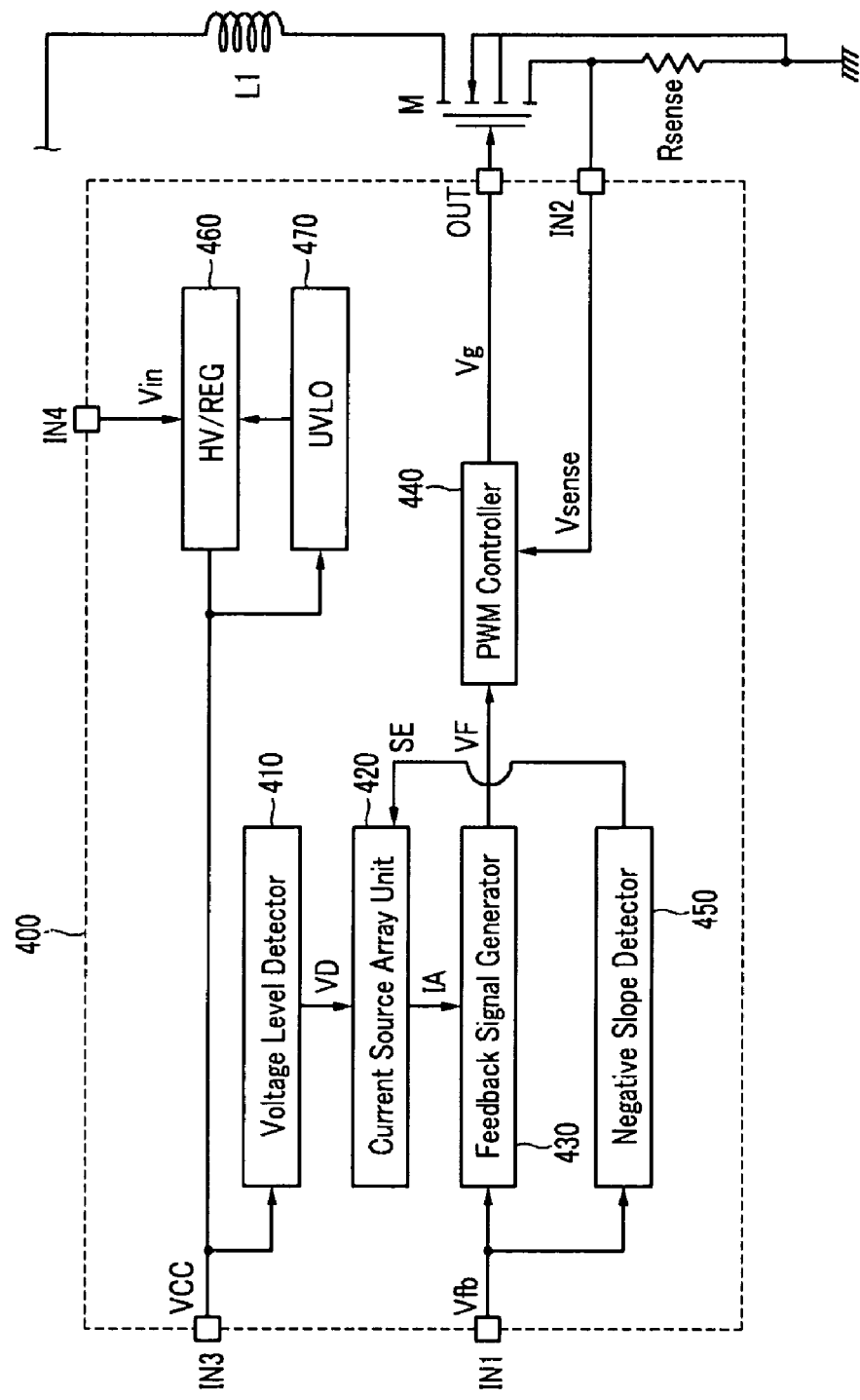
FIG. 3 shows a block diagram of a switch controller 400.

FIG. 3 shows a block diagram of a switch controller 400. The switch controller 400 may include a voltage level detector 410, a current source array unit 420, a feedback signal generator 430, a PWM controller 440, a negative slope detector 450, a high voltage regulator (HV/REG) 460, and an undervoltage lockout (UVLO) unit 470. The voltage level detector 410 can function as a timer.

The UVLO 470 can sense the first voltage VCC and stop the switch controller 400 when the first voltage VCC is decreases below a threshold value. The first voltage VCC biases the switch controller 400. Thus, when VCC decreases below the threshold value, it can cause the switch controller 400 to operate abnormally. Therefore, when sensing that the first voltage VCC decreases below the threshold value, the UVLO 470 can stop the switch controller 400 to prevent the abnormal operation.

The HV/REG 460 may receive the input voltage Vin and transmit a predetermined current to the capacitor Cc to thus generate the first voltage VCC.

The voltage level detector 410 may control the start and finish of the soft start. The voltage level detector 410 can control the start and finish of the soft start through the first voltage VCC. The voltage level detector 410 can receive the first voltage VCC and detect the level of the first voltage VCC. The voltage level detector 410 may transmit a signal VD, generated according to the result of the detection, to the current source array unit 420. In detail, the voltage level detector 410 can compare a plurality of step voltages having different levels to the first voltage VCC, generate a signal VD according to the result of the comparison, and transmit the result to the current source array unit 420. The step voltages can have different levels, and when the first voltage VCC reaches each step voltage, the voltage level detector 410 can change the signal VD and output the changed signal. The signal VD can vary according to the time when the first voltage reaches each step voltage: thus the voltage level detector 410 can function as a timer for the soft start methods.

The current source array unit 420 may include a plurality of current sources, and transmit a signal IA that is generated by the current sources for the feedback signal generator 430 in response to the signal VD.

The feedback signal generator 430 can generate a feedback signal VF corresponding to the feedback voltage Vfb and the signal IA. The feedback signal generator 430 may transmit the feedback signal VF to the PWM controller 440.

The negative slope detector 450 can receive the feedback voltage Vfb, sense the time when the feedback voltage Vfb waveform has a negative (−) slope, and generate a soft start finish signal SE. The negative slope detector 450 can transmit the finish signal SE to the current source array unit 420. The current source array unit 420 can transmit the signal IA to the feedback signal generator 430, which is generated by the current sources.

The PWM controller 440 can receive a feedback signal VF and a sense voltage Vsense to control the duty of the switch M. The PWM controller 440 can compare the feedback signal VF and the sense voltage Vsense to control the turning off of the switch M according to the result of the comparison. Also, the PWM controller 440 can turn on the switch M by using an internal clock signal having a predetermined period. In other embodiments, the PWM controller 440 can turn on the switch M at the bottom of a resonance waveform after the switch M is turned off and resonance occurs involving the switch M. In yet other embodiments the switch M can be turned on at a time appropriate for reducing the switching loss in addition to the bottom value of the resonance waveform. The PWM controller 440 can generate a gate control signal Vg so as to control the turning off or turning on of the switch M. In detail, in embodiments where the switch M is an N channel type MOSFET, the gate control signal Vg can have a sufficiently high voltage when the switch M is turned on, and it has a sufficiently low voltage when the switch M is turned off. The gate control signal Vg can be a voltage signal having different levels according to the channel type of the switch M.

Figure 4:
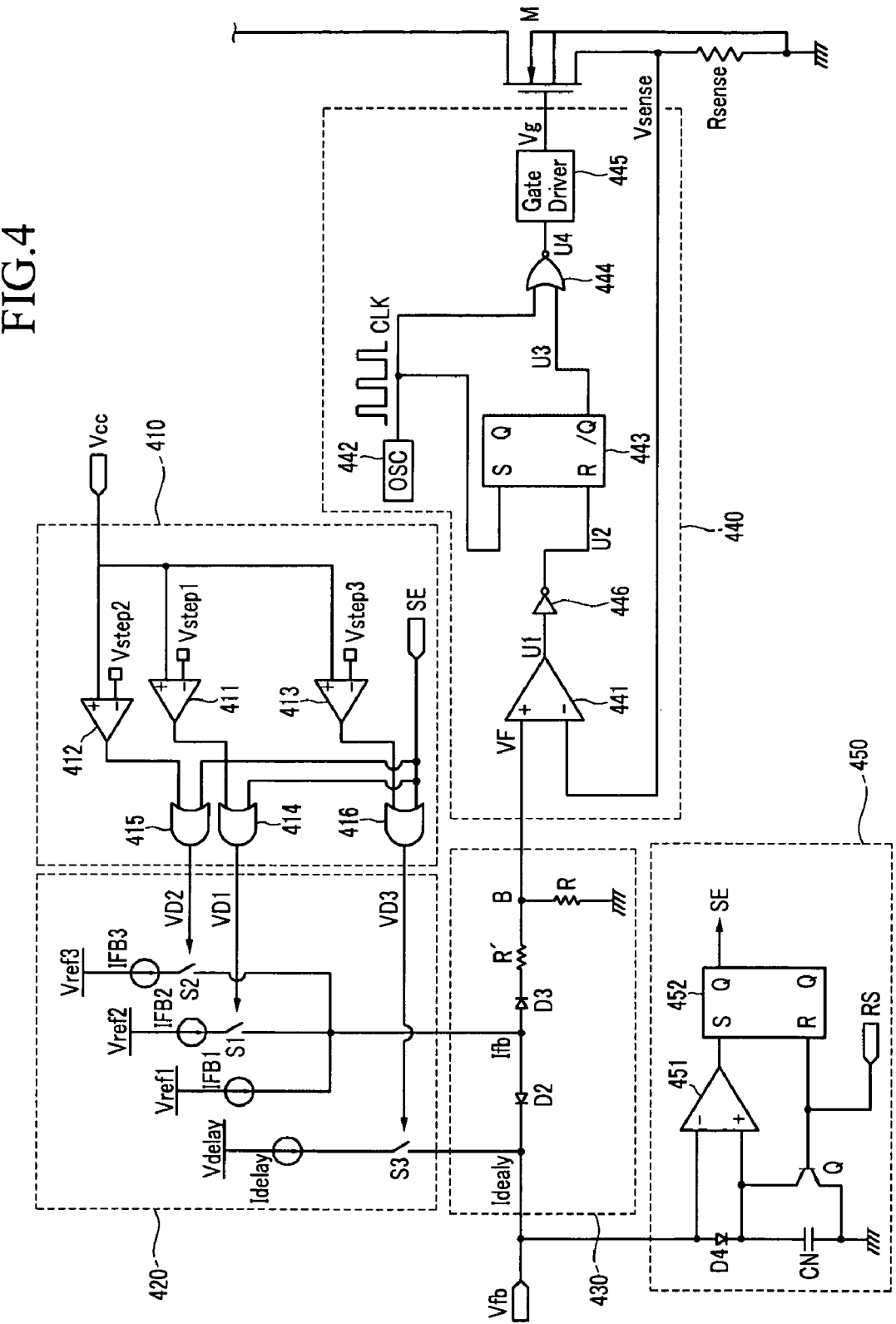
FIG. 4 shows a schematic diagram of a switch controller 400.

FIG. 4 shows a schematic diagram of a voltage level detector 410, a current source array unit 420, a feedback signal generator 430, a PWM controller 440, and a negative slope detector 450 of the switch controller 400. The signal VD generally indicates the signals, output by the voltage level detector 410. In the present embodiment three signals VD1, VD2, and VD3 are used.

The voltage level detector 410 can include a first comparator 411, a second comparator 412, a third comparator 413, a first OR gate 414, a second OR gate 415, and a third OR gate 416. The first voltage VCC can be transmitted to non-inverting terminals (+) of the first to third comparators 411 to 413. The first step voltage Vstep1 can be transmitted to an inverting terminal (−) of the first comparator 411. The second step voltage Vstep2 can be transmitted to an inverting terminal (−) of the second comparator 412. The third step voltage Vstep3 can be transmitted to an inverting terminal (−) of the third comparator 413. The first to third comparators 411 to 413 output the signals VD1, VD2, and VD3 that are generated by comparing the first voltage VCC that is transmitted to their non-inverting terminals (+) to the step voltages Vstep1, 2, and 3. The signals VD1, VD2, and VD3 are transmitted to the inverting terminals (−) of the first OR gate to the third OR gate 414 to 416. In detail, the first step voltage Vstep1 is greater than the second voltage step Vstep2, which is greater than the third step voltage Vstep3. When the first voltage VCC is less than the first step voltage Vstep1, the signals VD1, VD2, and VD3 output from the first to third comparators 411 to 413 can have a low level. When the first voltage VCC is greater than the first step voltage Vstep1 and is less than the second step voltage Vstep2, the signal VD1, output from the first comparator 411, can have a high level, and the signals VD2 and VD3, output from the second and third comparators 412 and 413 can have a low level. The signals VD1, VD2, and VD3 are determined according to the first voltage VCC and are transmitted to the current source array unit 420. The voltage level detector 410 can detect the level of the first voltage VCC by using the first to third step voltages, but it is not limited thereto. If needed, the voltage level detector 410 can detect the level through the same method by setting an appropriate number of step voltages. When the soft start finish signal SE assumes a high level, the voltage level detector 410 can transmit high-level signals VD1, VD2, and VD3 to the current source array unit 420. The soft start finish signal SE indicates that the first voltage VCC reached the third step voltage Vstep3 or the output voltage reached its rated level and is then stabilized.

As described above, the voltage level detector 410 can function as a timer by using a first duration in which the first voltage VCC reaches the first step voltage Vstep1, a second duration in which the first voltage VCC reaches the second step voltage Vstep2, and a third duration in which the first voltage VCC reaches the third step voltage Vstep3. The voltage level detector 410 can control the first to third durations by controlling the levels of the first to third step voltages, and the voltage level detector 410 can function as a timer and output a signal with predetermined time intervals since the signals VD1, VD2, and VD3 have different levels for the respective durations. The first to third step voltages are shown in the present embodiment. However, in other embodiments it is possible to set four or more voltage steps depending on the user's need. The first voltage VCC is generated when the input voltage Vin is charged into the capacitor Cc, and the capacitor Cc and the HV/REG 460 function as a signal generator for generating the first voltage VCC.

The current source array unit 420 may include three current source switches S1, S2, and S3 that are turned on or turned off according to the signals VD1, VD2, and VD3, and four current sources IFB1, IFB2, IFB3, and Idelay. The current source switch S1 can be coupled between the current source IFB2 and the feedback signal generator 430. The current source switch S1 can be turned on when the signal VD1 is high-level and turned off when the signal VD1 is low-level. The current source switch S2 can be coupled between the current source IFB3 and the feedback signal generator 430. The current source switch S2 can be turned on when the signal VD2 is high-level and turned off when the signal VD2 is low-level. The current source switch S3 can be coupled between the current source Idelay and the feedback signal generator 430. The current source switch S3 can be turned on when the signal VD3 is high-level and turned off when the signal VD3 is low-level.

A plurality of voltages Vref1, Vref2, Vref3, and Vdelay can be applied to first terminals of the four current sources IFB1, IFB2, IFB3, and Idelay. The voltages Vref1, Vref2, Vref3, and Vdelay are bias voltages. When the currents of the current sources IFB2, IFB3, and Idelay are transmitted to the feedback signal generator 430 according to the signals VD1, VD2, and VD3, the feedback signal VF can gradually increase. The signal IA shown in FIG. 3 includes both the current Idelay and the current Ifb shown in FIG. 4. The current Idelay and the current Ifb can be signals that correspond to the soft start signal. The switch controller 400 can transmit the soft start voltage to the PWM controller 440 based on the current Idelay and the current Ifb. Hereinafter, the switch controller can generate a soft start voltage as an example of the soft start signal and control the switching operation during the soft start duration.

The feedback signal generator 430 can include two diodes D2 and D3 and two resistors R' and R. The diode D2 can provide the feedback voltage Vfb through a cathode, and is coupled to a first terminal of the current source switch S3 of the current source array unit 420. An anode of the diode D2 can be coupled to a first terminal of the current source IFB1, first terminals of the current source switches S1 and S2, and an anode of the diode D3. A cathode of the diode D3 can be coupled to a first terminal of the resistor R'. A second terminal of the resistor R' can be coupled to a first terminal of the resistor R, and a node B, where the resistor R' and the resistor R meet. Node B can be coupled to a non-inverting terminal of a PWM comparator 441 of the PWM controller 440. A second terminal of the resistor R can be grounded. The output signal VF of the feedback signal generator 430 can be a voltage at the node B. In some embodiments the resistance of the resistor R' can be nine times that of the resistor R, in others a different multiple of R. The voltage applied to the node B can have the same waveform as that of the feedback voltage Vfb, and the level of the former can be ⅑ that of the latter. Before the current source switches S1, S2, and S3 are turned on, the current of the current source IFB1 flows through both diodes D2 and D3 to generate a feedback signal VF. When the current source switch S1 is turned on, the currents of the current sources IFB1 and IFB2 flow through both diodes D2 and D3 to generate a feedback signal VF. When the current source switch S2 is turned on, the currents of the current sources IFB1, IFB2, and IFB3 flow through the diodes D2 and D3 to generate a feedback signal VF. When the current source switch S3 is turned on, part of the current of the current source Idelay is transmitted to the capacitor Cfb, the feedback voltage Vfb increases, and the voltage level of the feedback signal VF increases.

The negative slope detector 450 can include the comparator 451, a first flip-flop 452, a switching transistor Q, a capacitor CN, and a diode D4. The switching transistor Q can use an npn bipolar junction transistor. However, the embodiment is not limited thereto, and any other switching element for performing the same operation can be used. The feedback voltage Vfb can be transmitted to the inverting terminal (−) of the comparator 451. The anode of the diode D4 can be also coupled to the inverting terminal (−) of the comparator 451. The cathode of the diode D4 can be coupled to the non-inverting terminal (+) of the comparator 451, a first terminal of the capacitor CN, and a collector of the switching transistor Q. A second terminal of the capacitor CN and an emitter of the switching transistor Q can be grounded. A set terminal S of the first flip-flop 452 can be coupled to an output terminal of the comparator 451, and a reset terminal R thereof can be coupled to a base of the switching transistor Q. A reset signal RS can be transmitted to the reset terminal R and the base of the switching transistor Q. During the soft start duration of the converter, the voltage charged into the capacitor CN can be less than the feedback voltage Vfb by the forward drop voltage of the diode D4. At this stage the comparator 451 may output a low-level signal. When the output voltage Vout reaches its rated level within the soft start setting duration, the feedback voltage Vfb can be abruptly reduced. The voltage at the anode of the diode D4 can be reduced to be less than the voltage at the cathode, and the voltage at the non-inverting terminal (+) of the output terminal of the comparator 451 can be greater than the voltage at the inverting terminal (−) of the output terminal thereof. Therefore, the comparator 451 can output a high-level signal. The first flip-flop 452 can be synchronized with the high-level signal that is input to the set terminal S to output a high-level soft start finish signal SE. The converter may generate a reset signal RS during its initial operation. Information of the respective internal circuits maybe reset before the switch controller 400 is operated. The reset resets the respective internal circuits and acquire accurate control. Also, in general, when overload protection, overvoltage protection, and thermal shutdown protection are enabled, the switch controller 400 may stop its operation. When the overload protection, the overvoltage protection, and the thermal shutdown protection are disabled after the switch controller 400 is stopped, a reset for resetting information in the switch controller 400 can be used. A reset signal RS can be transmitted to the negative slope detector 450. When a high-level reset signal RS is transmitted, the switching transistor Q can be turned on and the capacitor CN is discharged. A high-level signal can be input to the reset terminal R, and the soft start finish signal SE becomes low-level.

The PWM controller 440 can include a PWM comparator 441, an oscillator OSC 442, a second flip-flop 443, a NOR gate 444, a gate driver 445, and an inverter 446.

The PWM comparator 441 can receive a feedback signal VF through a non-inverting terminal (+) and a sense voltage Vsense through an inverting terminal (−). The PWM comparator 441 may transmit a signal U1 to the inverter 446 according to the comparison result of the feedback signal VF and the sense voltage Vsense. The signal U1 can have a high level when the feedback signal VF is greater than the sense voltage Vsense, and a low level when the feedback signal VF is less than the sense voltage Vsense.

The inverter 446 can invert the input signal U1 to generate a signal U2, and transmit the signal U2 to the reset terminal R of the second flip-flop 443.

The oscillator 442 may generate clock signals CLK having a predetermined period, and transmit the same to the set terminal S of the second flip-flop 443 and the NOR gate 444.

The second flip-flop 443 may generate a signal U3 according to the signal U2 and the clock signals CLK, and transmit the signal U3 to the NOR gate 444 through the output terminal/Q. The second flip-flop 443 may output a low-level signal U3 to the output terminal/Q when a high-level signal is input to the set terminal S, and a high-level signal U3 to the output terminal/Q when a high-level signal is input to the reset terminal S.

The NOR gate 444 may perform a NOR operation of the clock signal CLK and the signal U3 to generate a signal U4, and transmits the signal U4 to the gate driver 445. The NOR operation may generate a high-level output signal when the input signals are all low-level, and a low-level output signal when at least one of the input signals is high-level.

The gate driver 445 can generate a gate control signal Vg having a voltage level for turning on the switch M according to a high-level signal U4, and output the gate control signal Vg to the gate electrode of the switch M. The gate driver 445 can generate a gate control signal Vg having a voltage level for turning off the switch M according to a low-level signal U4, and output the gate control signal Vg to the gate electrode of the switch M. The levels of the signal U4 and the gate control signal Vg to turn off or turn on the switch M are only examples.

A switch control method and a converter driving method will now be described with reference to FIG. 5 to FIG. 7.

Figure 5:
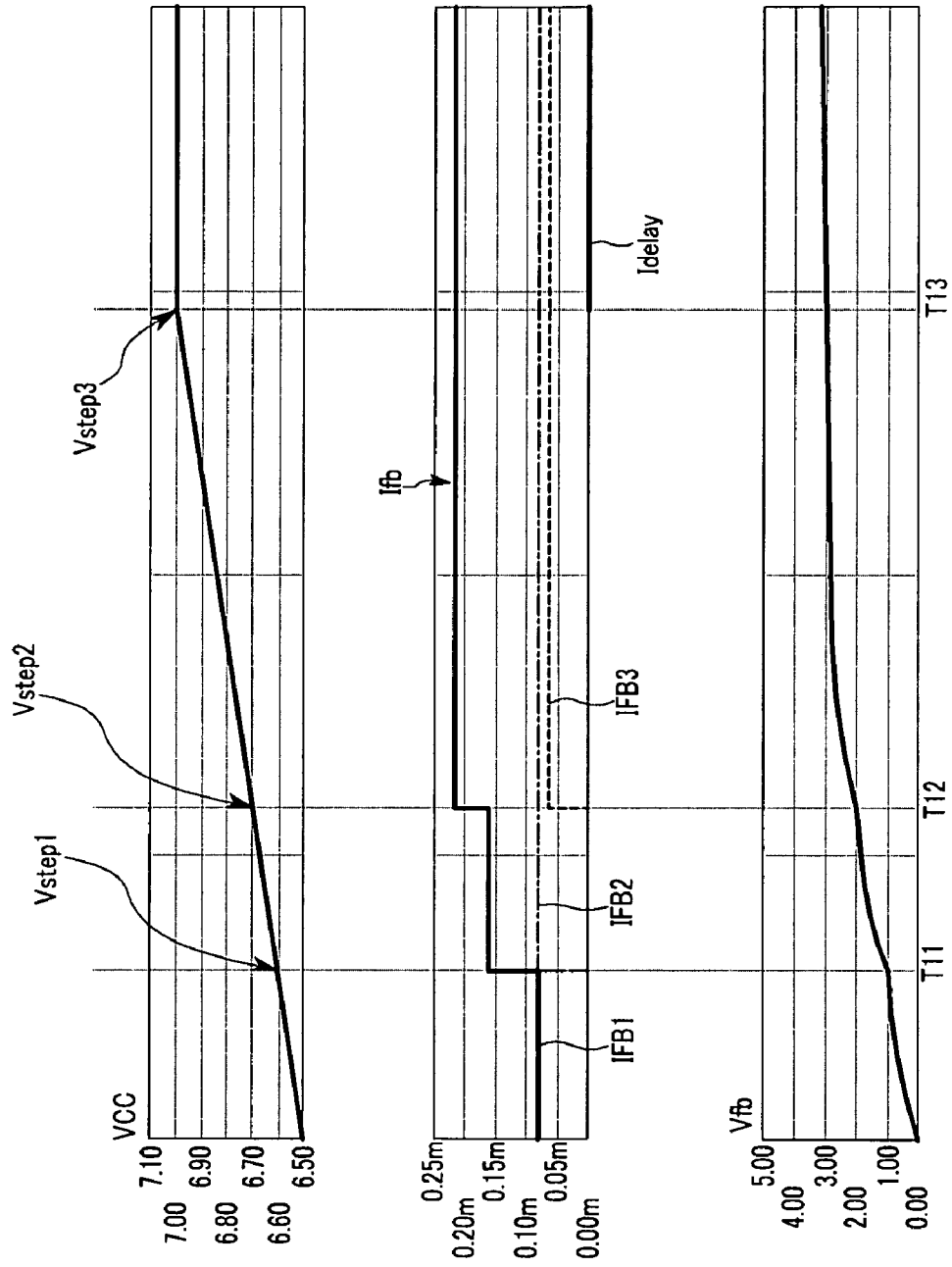
FIG. 5 shows waveforms of a first voltage VCC, a current Ifb, and a feedback voltage Vfb.

FIG. 5 shows waveforms of the first voltage VCC of the switch controller 400, the current Ifb, and the feedback voltage Vfb of a converter. When the soft start is started, the capacitor Cc can be charged by the current transmitted from the HV/REG 460, causing the first voltage VCC to increase gradually. The current Ifb can be generated by the current source IFB1, and the feedback voltage Vfb can be increased by the current Ifb. The first voltage VCC can be linearly increased by the time constant of the capacitor Cc. The feedback voltage Vfb can be increased in the form of a smoothly varying curve according to the time constant of the capacitor Cc charged with the feedback voltage Vfb and the resistors R' and R of the feedback signal generator.

At a time T11, when the first voltage VCC reaches the level of the first step voltage Vstep1, the current source switch S1 can be turned on by the signal VD1, the current Ifb can be increased by the current source IFB2, and the feedback voltage Vfb can be increased again in the form of a smooth curve. At a time T12, when the first voltage VCC reaches the level of the second step voltage Vstep1, the current source switch S2 can be turned on by the signal VD2, the current Ifb can be increased by the current source IFB3, and the feedback voltage Vfb can be increased again in the form of a smooth curve. At a time T13, when the first voltage VCC reaches the level of the third step voltage Vstep3, the current source switch S3 can be turned on by the signal VD3, the current Idelay of the current source Idelay can be transmitted to the capacitor Cc for charging the feedback voltage Vfb, and the feedback voltage Vfb can be increased again. The current Idelay can be less than those of the current sources IFB1, IFB2, and IFB3.

Figure 6:
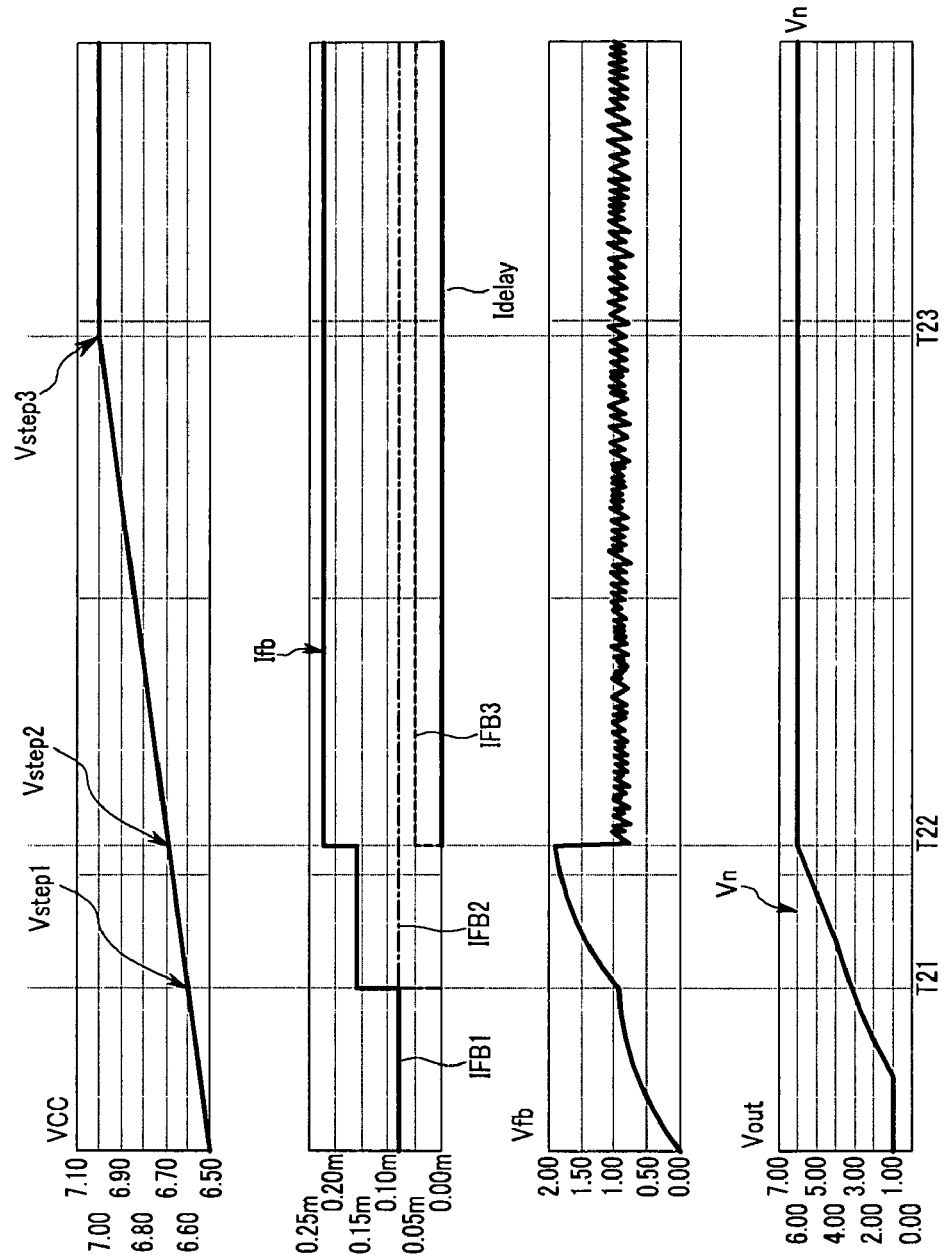
FIG. 6 shows waveforms of an output voltage Vout, a first voltage VCC, a current Ifb, and a feedback voltage Vfb when the output voltage Vout reaches a rated level Vn within a soft start setting duration Tss.

FIG. 6 shows waveforms of the output voltage Vout, the first voltage VCC, the current Ifb, and the feedback voltage Vfb when the output voltage Vout reaches its rated level Vn within a soft start setting duration Tss that is set by the switch controller 400 of the converter.

Before a time T22, the first voltage VCC, the current Ifb, and the feedback voltage Vfb can increase in a like manner described with reference to FIG. 5. At the time T22, when the output voltage Vout reaches the rated level voltage Vn, the feedback voltage Vfb can be steeply reduced. The negative slope detector 450 can sense the reduction of the feedback voltage Vfb, generate a soft start finish signal SE, and transmit the same to the voltage level detector 410. The output signals VD1, VD2, and VD3 of the voltage level detector 410 can become high-level according to the soft start finish signal SE, and the currents of the current source IFB3 and the current source Idelay can be transmitted to the feedback signal generator 430.

The feedback voltage Vfb can be steeply reduced when the output voltage Vout reaches the rated level voltage Vn because the current transmitted to the capacitor Cfb is reduced since the current flowing through the phototransistor PT coupled in parallel to the capacitor Cfb is increased by the output voltage Vout. The current Idelay of the current source Idelay can be applied to the feedback signal generator 430 starting from the soft start finish time.

In the conventional converter, the feedback voltage is varied (e.g., it increases the feedback voltage) when a load is changed after the output voltage reaches the rated level during the soft start duration. In such converters, when the feedback voltage is less than the soft start signal, the duty of the switching operation is determined by the low dominant method and not according to the feedback voltage but according to the soft start signal. Hence the output voltage is not regulated but is varied. In detail, according to the low dominant method, the switch turning off time is determined by the lesser one of the soft start signal and the feedback voltage.

The switch controller 400 can prevent this problem by using the negative slope detector 450. The negative slope detector 450 can sense the reduction of the feedback voltage Vfb and generates a soft start finish signal SE. The soft start is not generated again since the currents of the current sources IFB1, IFB2, IFB3, and Idelay are transmitted to the feedback signal generator 430 according to the soft start finish signal SE.

Figure 7:
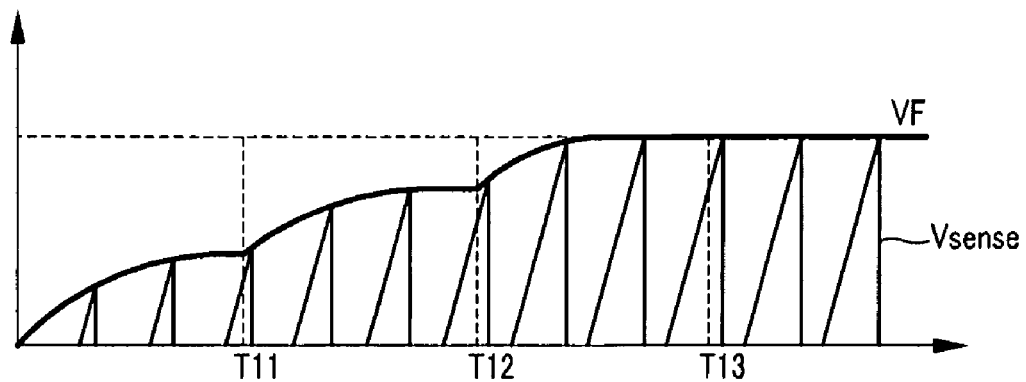
FIG. 7 shows a waveform of a sense voltage Vsense and a feedback signal VF.

FIG. 7 shows a waveform of a sense voltage Vsense and a feedback signal VF of the converter, which may control the soft start. When the soft start starts, the feedback signal VF may be increased in the form of a smooth curve. The sense voltage Vsense can correspond to the drain current flowing to the drain electrode when the switch M is turned on. The PWM comparator 441 of the PWM controller 440 can compare the sense voltage Vsense and the feedback signal VF to generate a signal U1. When the sense voltage Vsense increases and reaches the feedback signal VF, the signal U1 becomes low-level and the signal U2, generated by the inverter 446, becomes high-level. When the high-level signal U2 is transmitted to the reset terminal R of the second flip-flop 443, a high-level signal U3 may be transmitted to the NOR gate 444 through the output terminal/Q. The NOR gate 444 can generate a low-level signal U4 and transmit the signal U4 to the gate driver 445. The gate driver 445 can transmit a gate control signal Vg for turning off the switch M according to the signal.

When the switch M is turned off, no current flows to the switch M and no sense voltage Vsense is generated. Since the sense voltage Vsense becomes less than the feedback signal VF, the signal U1 output by the PWM comparator 441 becomes high-level, and the signal U2 input to the reset terminal R of the second flip-flop 443 becomes low-level. When the clock signal CLK is changed to the low level, the second flip-flop 443 can output a low-level signal U3. The NOR gate 444 may transmit a high-level signal U4 to the gate driver 445. The gate driver 445 may transmit the gate control signal Vg for turning on the switch M according to the high-level signal U4. The switch M may be turned on, the drain current flowing to the switch M increases again, and the sense voltage Vsense increases as well. In a like manner, the sense voltage Vsense is generated and the peak value of the sense voltage Vsense is controlled by the feedback signal VF.

The characteristics of the sense resistor Rsense can differ from that of the resistors (e.g. R1 and R2, or R' and R coupled to comparator 441) in the switch controller 400. When the converter's inner temperature rises, an increase of the resistance of the sense resistor Rsense can be different from an increase of the resistance of the resistors in the switch controller. In detail, the increase of the resistance of the sense resistor Rsense can be more than the increase of the resistance of the resistors in the switch controller. Such a design may adjust Ifb to compensate the effects of temperature variation. For this reason, the switch M may be turned off at a current Idrain when the converter's inner temperature is high which is lower than the turn-off current when the converter's temperature is low. This change can decrease the peak of the drain current Idrain. To compensate this difference, the switch controller 400 may adjust the current source according to the variations of the temperature. In such embodiments, the switch controller 400 can produce a constant current peak for the soft start duration as well as under normal condition, since the same reference current source is used during the soft start duration and the normal condition. Therefore some embodiments can achieve an essentially constant current peak any time.

An embodiment of a switch controller 400' will be described with reference to FIGS. 8 to 10.

Figure 8:
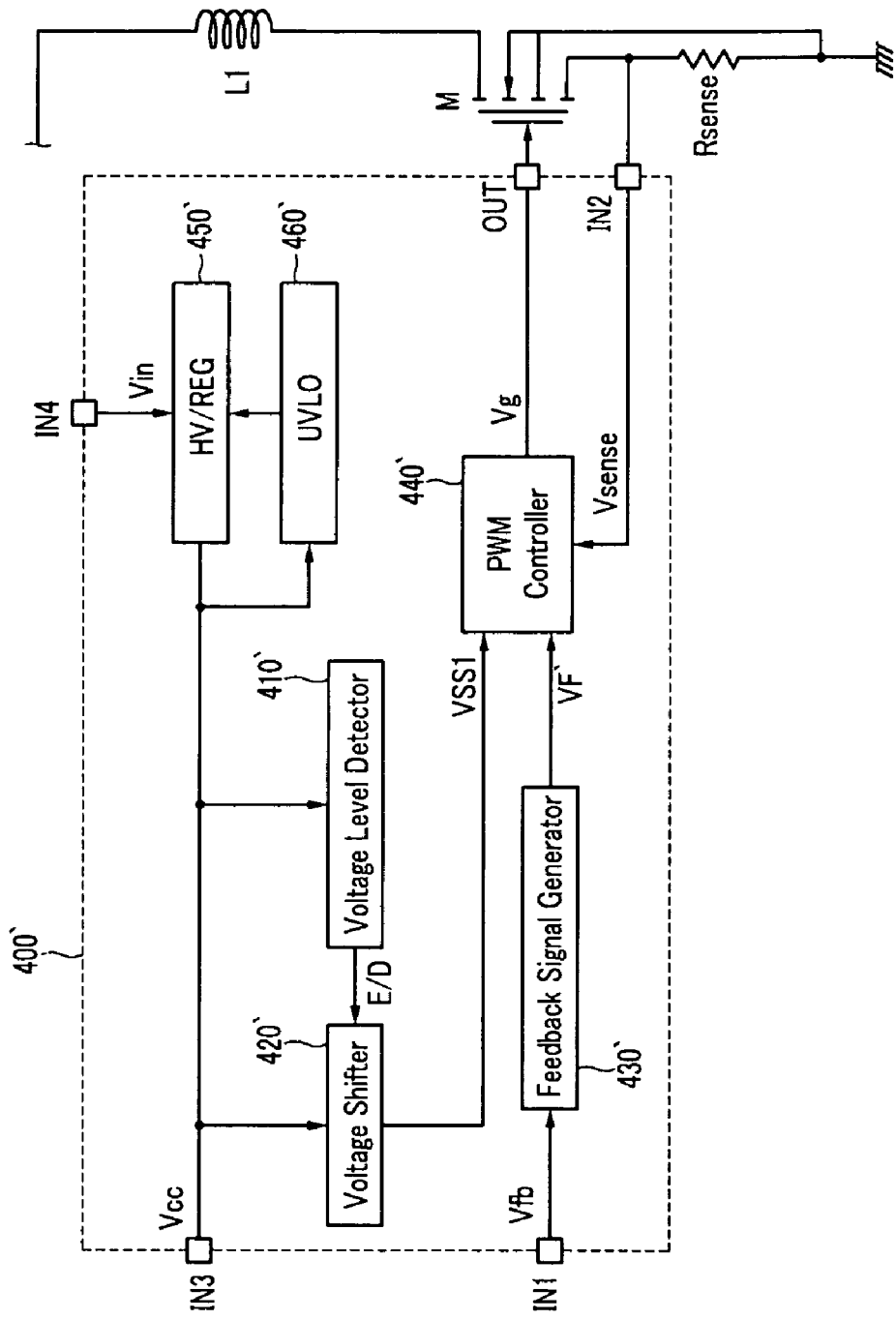
FIG. 8 shows a block diagram of a switch controller 400'.

FIG. 8 shows a block diagram of a switch controller 400'. The switch controller 400' may include a voltage level detector 410', a voltage shifter 420', a feedback signal generator 430', a PWM controller 440', an HV/REG 460', and a UVLO 470'. The switch controller 400' may have the same principle of generating the first voltage VCC as embodiments described earlier in relation to FIGS. 1-7. The operations and functions of the HV/REG 460' and the UVLO 470' can be similar to those of the earlier embodiments.

The voltage level detector 410' can control the start and finish of the soft start operation. The voltage level detector 410' can control the start and finish of the soft start operation by using the first voltage VCC.

The voltage level detector 410' can compare the soft start first voltage VCC and the reference voltage to control a voltage shifter 420'. In detail, when the first voltage VCC is greater than the reference voltage, the voltage shifter 420' can be enabled, and when the first voltage VCC is less than the reference voltage, the voltage shifter 420' can be disabled. The voltage level detector 410' can generate a signal E/D to the voltage shifter 420' so as to control the voltage shifter 420'.

The voltage shifter 420' can be operated or stopped according to the signal E/D. The voltage shifter 420' can use the first voltage VCC to generate a soft start voltage VSS1 to the PWM controller 440'. The voltage shifter 420' can generate a soft start voltage VSS1 by using the voltage that corresponds to the difference between the start voltage Vstart and the first voltage VCC.

The feedback signal generator 430' can generate a feedback signal VF' that corresponds to the feedback voltage Vfb to the PWM controller 440'. The feedback signal VF' can be a voltage signal that is generated by reducing the feedback voltage Vfb with a predetermined ratio.

The PWM controller 440' can control the turn-on and turn-off of the switch M by using the feedback signal VF' transmitted by the feedback signal generator 430', the soft start voltage VSS1, and the sense voltage Vsense. During the soft start duration, the soft start voltage VSS1, input to the PWM controller 440', can be less than the voltage of the feedback signal VF'. When the soft start duration is finished and the output voltage Vout reaches a rated level, the feedback voltage Vfb can be reduced. Accordingly, the voltage of the feedback signal VF' can become less than the soft start voltage VSS1. The PWM controller 440' can compare the sense voltage Vsense and the lesser one between the soft start voltage VSS1 and the feedback signal VF' to generate a gate control signal Vg to the gate electrode of the switch M.

Figure 9:
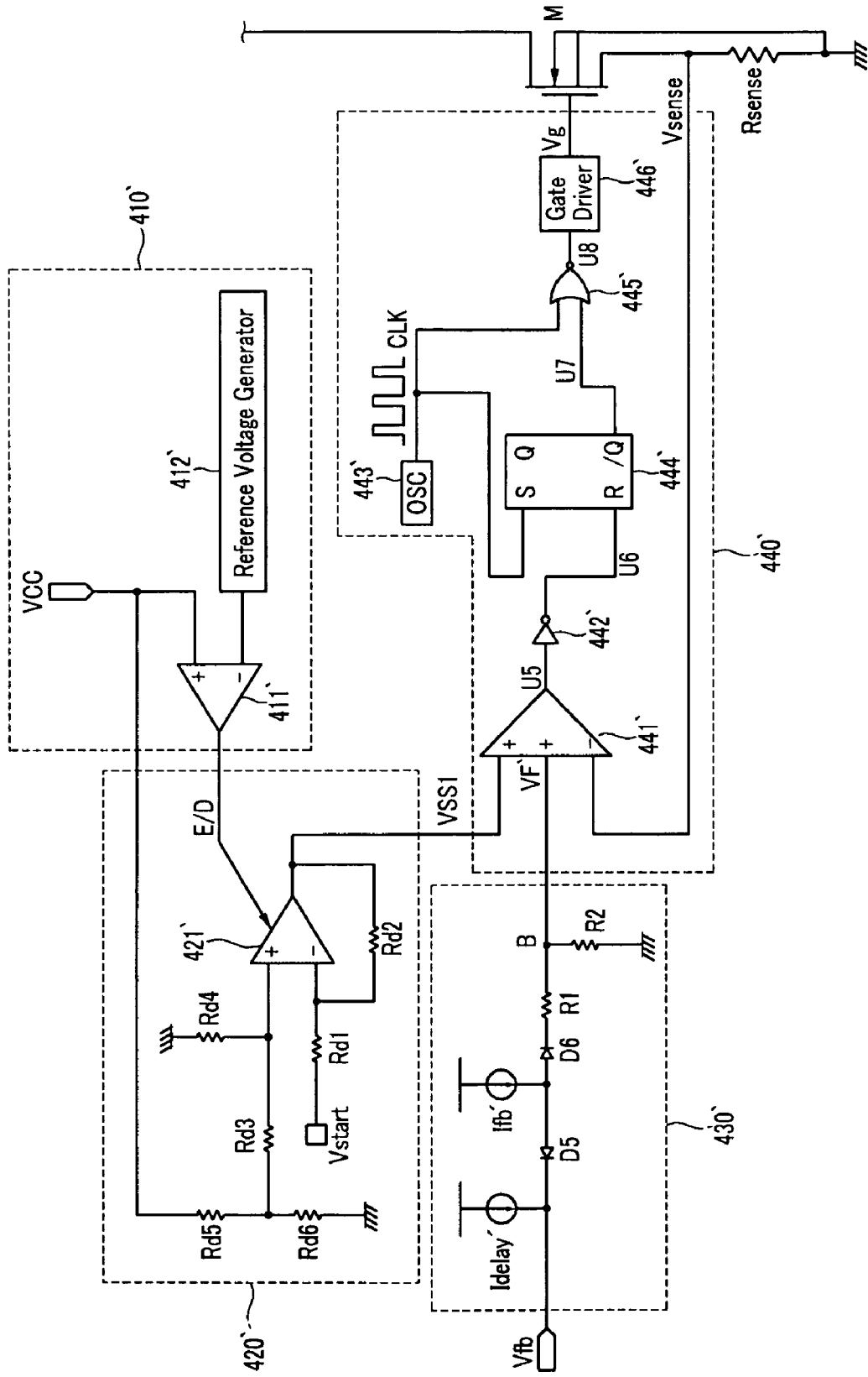
FIG. 9 shows a schematic diagram of a switch controller 400'.

FIG. 9 shows a schematic diagram of a switch controller 400'. The voltage level detector 410' can include a comparator 411' and a reference voltage generator 412'. The comparator 411' may receive the first voltage VCC through a non-inverting terminal (+), and a reference voltage VR from the reference voltage generator 412' through an inverting terminal (−). The reference voltage VR may range from the first level that is set for starting a soft start at the initial operation to the second level that is set for finishing the soft start. The comparator 411' may generate a high-level signal E/D to the voltage shifter 420' when the first voltage VCC at the non-inverting terminal (+) is greater than the first-level reference voltage VR. The comparator 411' may generate a low-level signal E/D to the voltage shifter 420' when the first voltage VCC becomes greater than a second-level reference voltage VR while the first voltage VCC is increased. In this embodiment, the high level of the signal E/D is a level for enabling the voltage shifter 420', and the low level is a level for disabling the voltage shifter 420'.

The voltage shifter 420' may include a plurality of resistors Rd1 to Rd5 and an amplifier 421'. The amplifier 421' may be controlled by the signal E/D. In detail, the voltage shifter 420' can start its operation in synchronization with the time when the signal E/D is changed from the low level to the high level, and maintain the soft start voltage VSS1 in synchronization with the time when the signal E/D is changed from the high level to the low level. The amplifier 421' may amplify the difference between the voltage VA and the start voltage Vstart that is generated by dividing the first voltage VCC according to the resistance ratio of the two resistors Rd5 and Rd6 and generate a soft start voltage VSS1, which is expressed in Equation 1. The soft start voltage VSS is transmitted to the PWM controller 440'. The amplifier 421' may maintain the soft start voltage VS S1 when it is stopped by the signal E/D:

$$VSS1 = \frac{Rd2}{Rd1}(VA - Vstart) \quad (1)$$

The feedback signal generator 430' may include diodes D5 and D6, resistors R1 and R2, and current sources Idelay' and Ifb'. A cathode of the diode D5 can be coupled to a first terminal of the capacitor Cfb (refer to FIG. 1), and the feedback voltage Vfb may be applied to a cathode of the diode D5. The current of the current source Idelay' can flow through the capacitor Cfb. Anodes of the diodes D5 and D6 are coupled to each other and the current of the current source Ifb' flows to the diodes D5 and D6. A first terminal of the resistor R1 may be coupled to a cathode of the diode D6, and a second terminal of the resistor R1 may be coupled to a first terminal of the resistor R2 and one of two non-inverting terminals (+) of a comparator 441' of the PWM controller 440'. A second terminal of the resistor R2 may be grounded. The voltage that is generated when the current of the current source Ifb' flowing through the diode D6 flows to the resistors R1 and R2 is the voltage of the feedback signal VF'. The above-generated voltage VF' can correspond to the voltage that is generated by dividing the feedback voltage Vfb according to the resistance ratio of the resistors R1 and R2.

The PWM controller 440' may include the PWM comparator 441', an inverter 442', an oscillator OSC 443', a third flip-flop 444', a NOR gate 445', and a gate driver 446'.

The PWM comparator 441' may receive the soft start voltage VSS, the feedback signal VF', and the sense voltage Vsense, and compare the sense voltage Vsense and the lower of the soft start voltage VSS1 and the feedback signal VF' to generate a signal U5. In detail, during the duration in which the soft start voltage VSS1 is less than the feedback signal VF', the PWM comparator 441' may generate the signal U5 according to the result of the comparison of the soft start voltage VSS and the sense voltage Vsense. On the other hand, during the duration in which the feedback signal VF' is less than the soft start voltage VSS1, the PWM comparator 441' can generate the signal U5 according to the result of the comparison of the feedback signal VF' and the sense voltage Vsense. For example, during the duration in which the feedback signal VF' is less than the soft start voltage VSS1, the signal U5 can become high-level when the feedback signal VF' is greater than the sense voltage Vsense, and it becomes low-level when the feedback signal VF' is less than the sense voltage Vsense.

The inverter 442' may generate a signal U6 by inverting the input signal U5, and transmit the signal U6 to the reset terminal R of the third flip-flop 444'.

The oscillator 443' can generate clock signals CLK having a predetermined period and transmit the clock signals CLK to the set terminal S of the third flip-flop 444' and the NOR gate 445'.

The third flip-flop 444' may generate a signal U7 according to the signal U6 and the clock signals CLK, and transmit the signal U7 to the NOR gate 445'. The third flip-flop 444' may be operated in a like manner of the second flip-flop 443 of FIG. 4. The third flip-flop 444' can generate a signal U7 according to the signals that are input to the set terminal S and the reset terminal R, and transmit the signal-U7 to the NOR gate 445' through the output terminal/Q.

The NOR gate 445' may perform a NOR operation on the clock signal CLK and the signal U7 to generate a signal U8, and transmit the signal U8 to the gate driver 446'.

The gate driver 446' can generate a gate control signal Vg having a voltage level for turning on the switch M according to the high-level signal U8, and output the gate control signal Vg to the gate electrode of the switch M. The gate driver 446' can generate the gate control signal Vg having a voltage level for turning off the switch M according to the low-level signal U8, and output the gate control signal Vg to the gate electrode of the switch M.

A switch control method and a converter driving method will now be described referring to FIG. 10.

Figure 10:
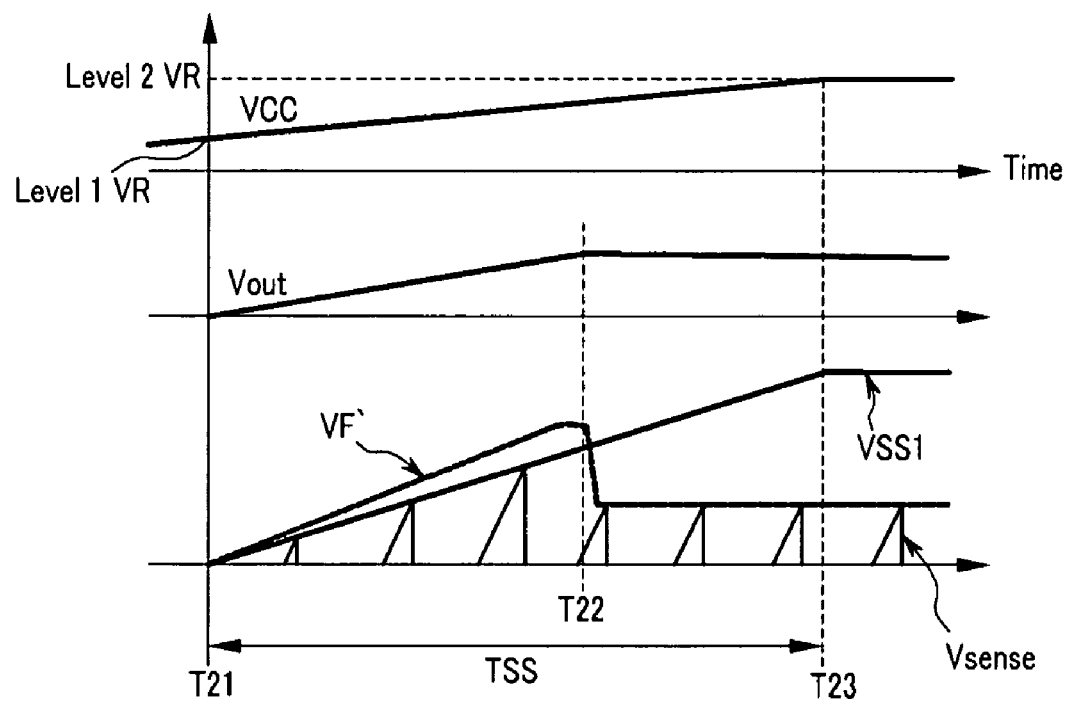
FIG. 10 shows waveforms of a first voltage VCC, an output voltage Vout, a feedback signal VF', a sense voltage Vsense, and a soft start voltage VSS1.

FIG. 10 shows a waveform of a first voltage VCC, a feedback signal VF', a sense voltage Vsense, a soft start voltage VSS1, and an output voltage Vout of the converter. A soft start can begin at the time T21 when the first voltage VCC becomes the reference voltage VR of the first level. When the soft start begins, the soft start voltage VSS1 increases. The soft start voltage VSS1 may have a voltage level that is less than that of the feedback signal VF' until the time T22 when the output voltage Vout reaches the rated value. Therefore, during the duration T21-T22, the comparator 441' of the PWM controller 440' compares the sense voltage Vsense and the soft start voltage VSS1 to generate a signal U5. When the sense voltage Vsense becomes equal to the soft start voltage VSS, the signal U5 becomes low-level, and the signal U6 generated by the inverter 442' can become high-level. When the high-level signal U6 is transmitted to the reset terminal R of the third flip-flop 444', a high-level signal U7 may be transmitted to the NOR gate 445' through the output terminal/Q. The NOR gate 445' can generate a low-level signal U8, and transmit the low-level signal U8 to the gate driver 446'. The gate driver 446' can transmit the gate control signal Vg for turning off the switch M according to the signal U8 to the gate electrode of the switch M. When the switch M is turned off, no current flows to the switch M, and no sense voltage Vsense is generated. Since the sense voltage Vsense is less than the soft start voltage VSS1, the signal U5 output by the comparator 441' becomes high-level, and the signal U6 input to the reset terminal R of the third flip-flop 444' becomes low-level. When the clock signal CLK changes to the high level, the third flip-flop 444' outputs a low-level signal U7. The NOR gate 445' can transmit a high-level signal U8 to the gate driver 446'. The gate driver 446' may transmit a gate control signal Vg for turning on the switch M according to the high-level signal U8 to the gate electrode of the switch M. The switch M is turned on and the current flowing to the switch M increases to increase the sense voltage Vsense. Accordingly, the peak value of the sense voltage Vsense is controlled by the soft start voltage VSS1 during the durations T21-T22.

When the output voltage Vout reaches the rated value at the time T22, the feedback voltage Vfb may be steeply reduced, as well as the feedback signal VF'. The feedback signal VF' may become less than the soft start voltage VSS1 after the time T22, and the peak value of the sense voltage Vsense may be controlled by the feedback signal VF'. That is, the peak value of the current flowing to the switch M may be determined by the feedback voltage Vfb. When the first voltage VCC corresponds to the reference voltage VR with a second level at the time T23, the soft start setting duration is finished.

The switch controller 400' may also include a negative slope detector 450 as included in the switch controller 400 of FIG. 4.

Figure 11:
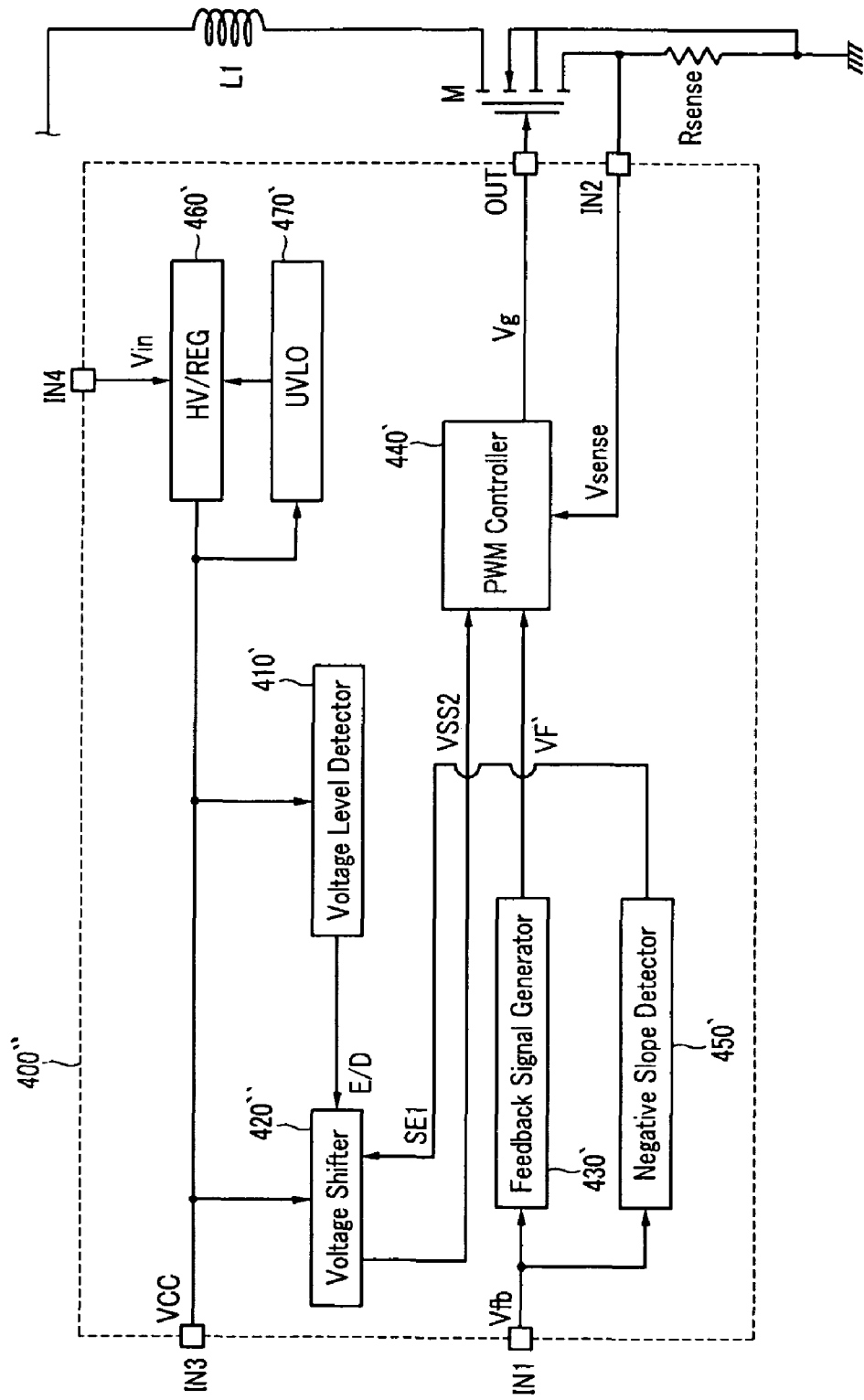
FIG. 11 shows a block diagram of a switch controller 400" including a negative slope detector 450'.

FIG. 11 shows a switch controller 400'' including a negative slope detector 450'. As shown in FIG. 11, the negative slope detector 450' can receive the feedback voltage and transmit the soft start finish signal SE1 to the voltage shifter 420''.

The voltage shifter 420'' can generate and output the soft start voltage VSS2 as the maximum value of the soft start voltage in response to the soft start finish signal SE1. Here, the maximum value is a voltage level that is greater than the greatest voltage level of the feedback signal VF'. The PWM controller 440' may determine the time for turning off the switch M by using the sense voltage Vsense and the feedback signal VF' that is less than the soft start voltage VSS2, starting from the time when the soft start is finished. Another configuration and corresponding connection states thereof correspond to those of the switch controller 400' of FIG. 8.

Figure 12:
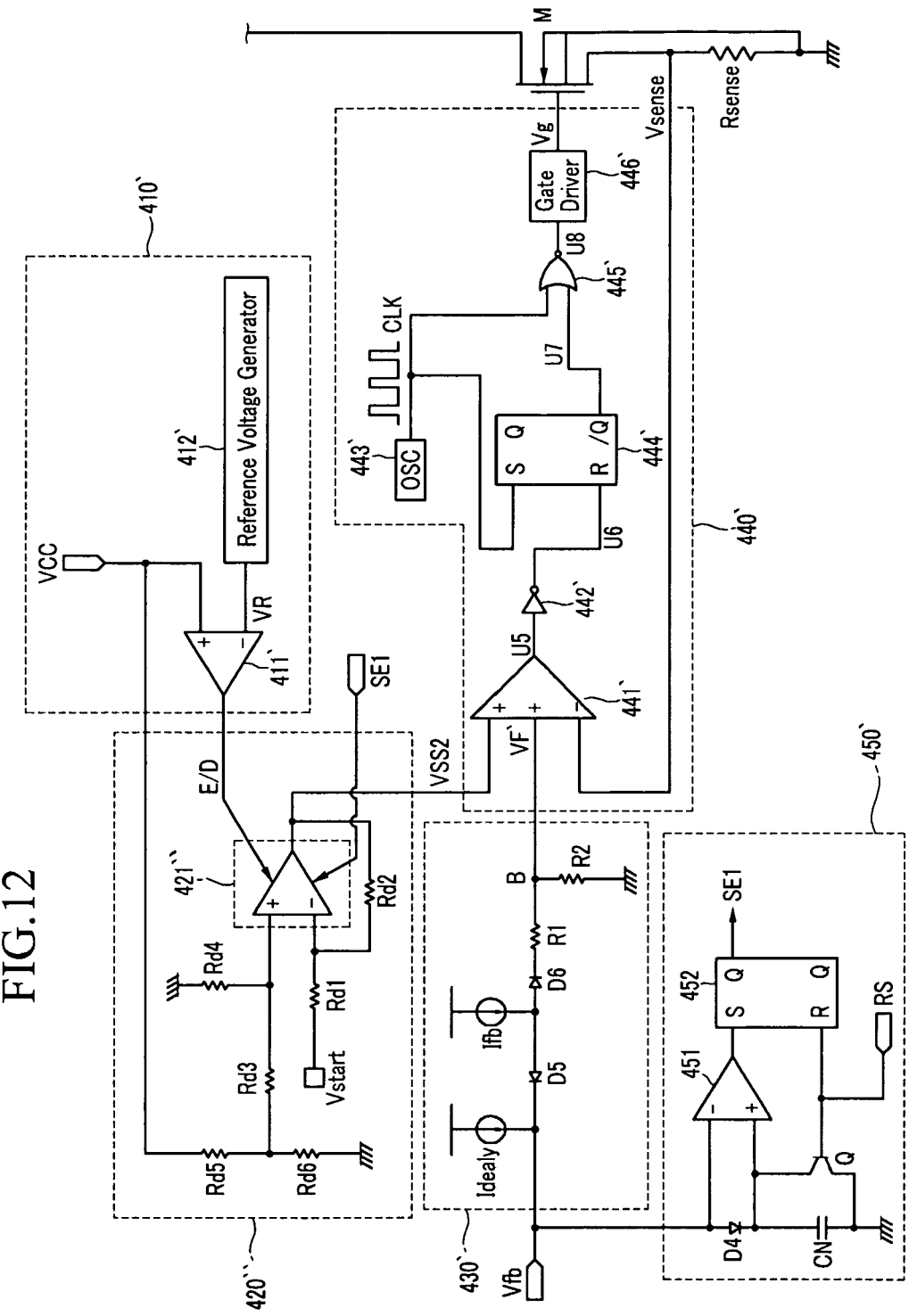
FIG. 12 shows a schematic diagram of a switch controller 400".

FIG. 12 shows a detailed switch controller 400''. The soft start finish signal SE1 of the negative slope detector 450' may be transmitted to the voltage shifter 420''. In detail, on receiving the soft start finish signal SE1, the amplifier 421'' of the voltage shifter 420'' can be synchronized with the time when the soft start finish signal SE1 is transmitted, generate the peak value of the predetermined soft start voltage VSS2 and output the peak value to the non-inverting terminal (+) of the comparator 441' of the PWM controller 440'. The comparator 441' may compare the sense voltage Vsense and the voltage of the feedback signal VF' to generate a signal U5. Most of the other features of this embodiment can be analogous to those of FIG. 4.

A soft start voltage VSS1 and a soft start voltage VSS2 according to some embodiments will now be described referring to FIG. 13.

Figure 13:
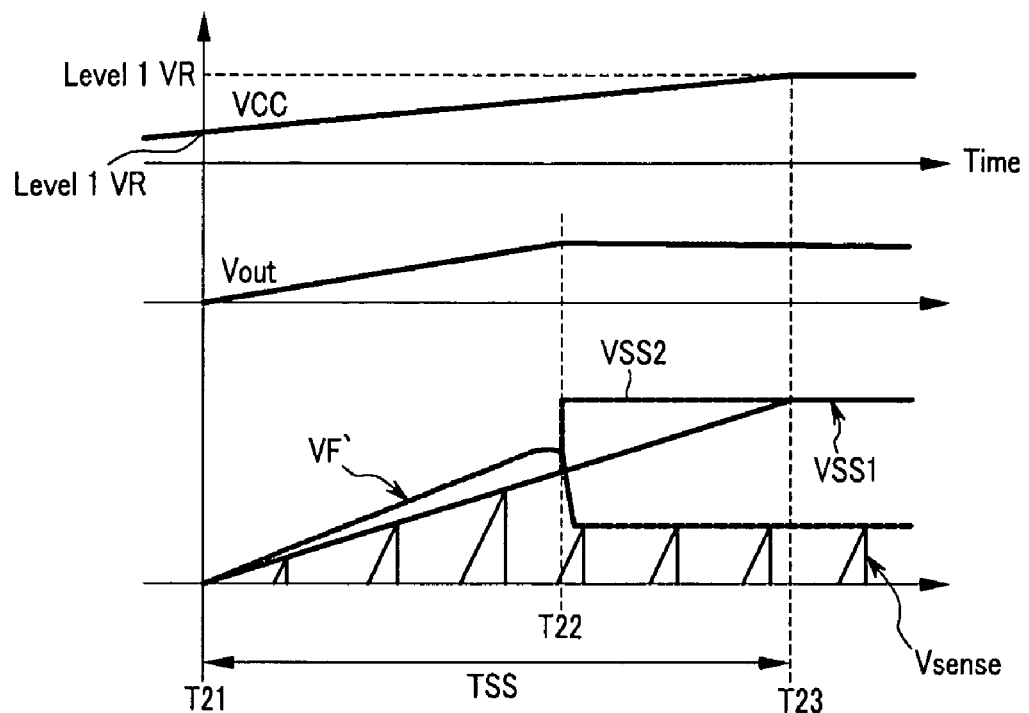
FIG. 13 shows waveforms of a first voltage VCC, a feedback signal VF', and a sense voltage Vsense of a switch controller 400", a soft start voltage VSS2 and an output voltage Vout of a converter according to a third exemplary embodiment.

FIG. 13 shows waveforms of a first voltage VCC, a feedback signal VF', and a sense voltage Vsense of a switch controller 400'', and a soft start voltage VSS2 and an output voltage Vout of a converter according to the embodiment of FIG. 11. A soft start voltage VSS1 according to the embodiment of FIG. 10 is illustrated in FIG. 13.

When the output voltage reaches a rated value and the feedback voltage Vfb is reduced at the time T22, the feedback signal VF' may be also reduced. The soft start voltage VSS2 can be increased to the peak soft start voltage that is set by the soft start finish signal SE1, differing from the soft start voltage VSS1 of the embodiment of FIG. 10.

Figure 14:
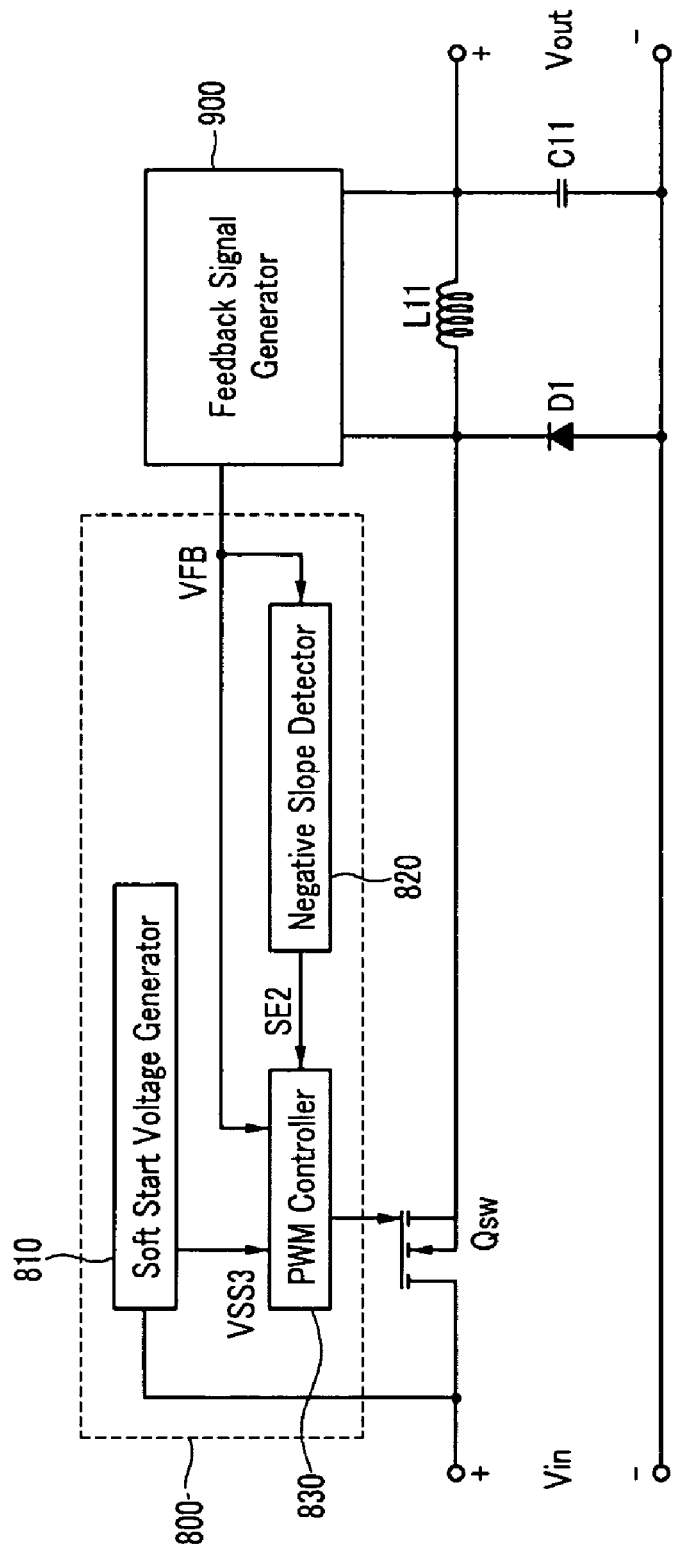
FIG. 14 shows a block diagram of diagram of a converter.

FIG. 14 shows a diagram of another embodiment of a converter. The converter may include a switch Qsw, a switch controller 800, a feedback signal generator 900, a capacitor C11, a diode D11, and an inductor L11. The switch Qsw can be an n-channel type MOSFET including a gate electrode, a source electrode, and a drain electrode.

The terminals of the capacitor C11 may be coupled to the output terminal to filter the ripple component of the output voltage Vout. The inductor L11 may be coupled to a first terminal of the capacitor C11 and a non-inverting terminal (+) of the output terminal. A cathode of the diode D11 may be coupled to a second terminal of the inductor L11, and an anode thereof may be coupled to an inverting terminal (−) of the output terminal. The capacitor C11 and the inductor L11 form an LC filter to remove an AC component of the input voltage and generate an output voltage Vout. The diode D11 for forming a freewheeling path may be used to control the current stored in the inductor L11 to flow through the path of the capacitor C11 and the diode D11 when the switch Qsw is turned off.

The feedback signal generator 900 may generate a feedback signal by using the voltage applied to the inductor L11, and transmit the feedback signal to the switch controller 800. A voltage having the same intensity as that of the output voltage Vout may be applied to the inductor L11 while the switch Qsw is turned off, and the feedback signal generator 900 samples and holds the voltage to divide the same into a predetermined voltage range and thus generate a feedback signal VFB. The feedback signal generator 900 may transmit the feedback signal VFB to a negative slope detector 820 and a PWM controller 830 of the switch controller 800.

The switch controller 800 may include a soft start voltage generator 810, a negative slope detector 820, and a PWM controller 830. The soft start voltage generator 810 can generate a first voltage VCC by using an input voltage Vin. The method for generating the first voltage VCC can correspond to that of the previous embodiments. The soft start voltage generator 810 can generate a soft start voltage VSS3 in the same way as the previous embodiments: by using the first voltage VCC. Also, the method for the soft start voltage generator 810 to generate a soft start voltage VSS3 can also correspond to the methods according to the previous embodiments. In detail, the voltage signal that is generated when the current Ifb generated by the current source array unit (420 in FIG. 4) flows to a resistor can be generated as the soft start voltage VSS3. Also, the method for generating the soft start voltages VSS1 and VSS2 according to the previous embodiments can be used. In particular, the soft start voltage generator 810 can transmit the generated soft start voltage VSS3 to the PWM controller 830.

The negative slope detector 820 may receive the feedback signal VFB to detect the time when the feedback signal VFB is reduced in the manner of the previous embodiments. The negative slope detector 820 can generate a soft start finish signal SE2 at that time and transmit the same to the soft start voltage generator 810. The soft start voltage generator 810 can increase the level of the soft start voltage VSS3 to be greater than the peak level of the feedback signal VFB according to the soft start finish signal SE3, and maintains the soft start voltage VSS3 at the level.

The PWM controller 830 can compare a reference voltage having a predetermined level and a lesser one between the soft start voltage VSS3 and the voltage of the feedback signal VFB to control the switching operation. At the initial operation, the soft start voltage VSS3 can be less than the feedback signal VFB, and the PWM controller 830 may turn off the switch Qsw when the reference voltage reaches the soft start voltage VSS3. On receiving the soft start finish signal SE2, the soft start voltage generator 810 can maintain the soft start voltage VSS3 at a level that is greater than the peak level of the feedback signal VFB. Therefore, the PWM controller 830 can control the switching operation by using the feedback voltage VFB that is less than the soft start voltage VSS3. The PWM controller 830 may turn off the switch Qsw when the reference voltage reaches the feedback signal VFB. The PWM controller 830 includes an oscillator (not shown) for generating clock signals with a predetermined period, and may turn on the turned off switch Qsw when being synchronized with the rising edge of the clock signal.

The switch controller can be applied to the converter and then be used to control the soft start. Therefore, the soft start method can be realized without using the conventional large and complex circuit such as the counter or the digital/analog converter.

Further, the switch and the switch controller described in the above embodiments can be realized as an integrated circuit, IC. Also, the switch and the switch controller can be formed on separate chips, and the chips can be then formed as a single package or packages.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the present invention, a switch controller having a simple structure and allowing an accurate soft start control, a control method, a converter using the same, and a driving method thereof are provided.

In addition, a switch controller for preventing reduction of the peak value of the current that flows to the switch according to the temperature increase during the soft start predetermined duration, a control method, a converter using the same, and a driving method thereof are provided.

What is claimed is:

1. A switch controller of a converter for converting an input signal into an output signal according to a switching operation by a switch, the switch controller comprising:
   a soft start signal generator for generating a soft start signal that is increased for a predetermined duration starting at a starting time of operation; and
   a PWM controller for controlling the switching operation of the switch by using a current flowing to the switch and a feedback signal based on the soft start signal during the predetermined duration, wherein the soft start signal generator comprises:
   a voltage level detector for detecting a level of a first voltage generated by using the input signal, and controlling the soft start signal to be increased each time the first voltage reaches one of a set of predetermined levels; and
   a current source array unit for increasing the soft start signal by outputting a corresponding first current of a first current source from among a plurality of current sources according to the detected level of the first voltage.

2. The switch controller of claim 1, the switch controller further comprising a negative slope detector for sensing a feedback signal that corresponds to the output signal, and for detecting a time when the feedback signal is reduced, wherein
   the negative slope detector is configured to output a soft start finish signal when sensing that the feedback signal is reduced.

3. The switch controller of claim 2, the negative slope detector comprising:
   a diode having an anode for receiving the feedback signal;
   a capacitor having a first terminal coupled to a cathode of the diode;
   a switching element having a first electrode coupled to a first terminal of the capacitor and a second electrode coupled to a second terminal of the capacitor, and discharging the capacitor at a starting time of the operation of the converter;
   a comparator having an inverting terminal coupled to the anode of the diode and a non-inverting terminal coupled to the cathode thereof; and
   a flip-flop having a first terminal coupled to an output terminal of the comparator and a first output terminal for outputting a signal in response to the output of the comparator, and configured to be reset at the starting time of the operation.

4. The switch controller of claim 2, wherein
   the voltage level detector is configured to compare the first voltage and at least two step voltages and to combine a first current that corresponds to the step voltage from among the plurality of current sources of the current source array unit with the feedback voltage to generate a feedback signal.

5. The switch controller of claim 4, the voltage level detector comprising:
   a first comparator for comparing the first voltage and the first step voltage from among the at least two step voltages; and
   a logical operator block for comparing the soft start finish signal and a signal that is output by the first comparator according to the comparison result.

6. The switch controller of claim 5, wherein
   the voltage level detector is configured to output a high-level signal when the first voltage is greater than the first step voltage, the soft start finish signal is a high level, and the logical operator is configured to perform an OR operation.

7. The switch controller of claim 1, wherein
   the switch and the switch controller are formed on a chip.

8. The switch controller of claim 1, wherein
   the switch and the switch controller are formed on separate chips.

9. A converter comprising:
   a switch;
   an energy transfer element for converting input energy into output energy according to a switching operation by the switch; and
   a switch controller for generating a first voltage by using the input energy, generating a soft start signal according to the first voltage during a soft start duration, and controlling the switching operation of the switch by using the soft start signal, a feedback voltage corresponding to the output energy, and a current flowing to the switch, wherein the switch controller comprises:
   a voltage level detector for detecting a level of the first voltage, and for controlling the soft start signal to be increased each time the first voltage reaches one of a plurality of a predetermined levels;
   a current source array unit for generating the soft start signal by outputting a corresponding first current of a first current source from among a plurality of current sources according to the detected level of the first voltage; and
   a negative slope detector for stopping the soft start when sensing a negative slope of the feedback voltage waveform.

10. The converter of claim 9, the converter comprising:
    a feedback signal generator for receiving the feedback voltage and the soft start signal and generating a feedback signal; and
    a PWM controller for controlling the switching operation of the switch by using the feedback signal and the sense voltage during the soft start duration.

11. The converter of claim 10, the feedback signal generator comprising:
a first diode having a cathode coupled to a capacitor for generating the feedback voltage;
a second diode having an anode coupled to an anode of the first diode;
a first resistor having a first terminal coupled to a cathode of the second diode; and
a second resistor having a first terminal coupled to a second terminal of the first resistor, and a grounded second terminal,
wherein the soft start signal comprises a second current generated by at least one of the first current sources and a third current generated by another one of the first current sources, the third current is transmitted to the capacitor, and the second current is transmitted to a node where each the anode of the first diode and the anode of the second diode is coupled.

12. The converter of claim 11, the converter comprising:
a high voltage regulator for generating the first voltage by using an input voltage of the input energy; and
an undervoltage lockout unit for stopping an operation of the switch controller when sensing that a level of the first voltage is less than a predetermined level.

13. The converter of claim 11, wherein
the voltage level detector is configured to compare the first voltage and at least two step voltages, and to output a first current of the current source, that corresponds to the step voltage from among a plurality of current sources of the current source array unit, to the feedback signal generator.

14. The converter of claim 13, the voltage level detector comprising:
a first comparator for comparing the first voltage and the first step voltage from among the at least two step voltages; and
a logical operator for comparing a signal that is output by the first comparator according to the comparison result and a soft start finish signal for finishing the soft start by the negative slope detector.

15. The converter of claim 14, wherein
the voltage level detector is configured to output a high-level signal when the first voltage is greater than the first step voltage, the soft start finish signal is a high level, and the logical operator performs an OR operation.

16. The converter of claim 13, the current source array unit comprising a current source switch that is turned on to control the first current to flow when the first voltage is greater than the first step voltage from among the at least two step voltages.

17. The converter of claim 16, wherein
one of the current source switches is coupled between the current source for generating the lowest current from among the current sources and the cathode of the first diode, and
first terminals of the current source switches are coupled to a plurality of current sources, and second terminals thereof are coupled to the node.

18. The converter of claim 17, wherein
one of the current sources is coupled to the node from the soft start duration beginning time.

19. The converter of claim 9, wherein
the negative slope detector is configured to compare the reduced feedback voltage and the feedback voltage before reduction to detect a negative slope of the feedback voltage, and to generate a soft start finish signal to the voltage level detector when the feedback voltage is reduced as the output voltage of the output energy reaches a rated value.

20. The converter of claim 19, the negative slope detector comprising:
a first diode having an anode for receiving the feedback signal;
a capacitor having a first terminal coupled to a cathode of the first diode;
a switching transistor having a first electrode coupled to a second terminal of the capacitor, a second electrode coupled to the cathode of the first diode, and a control electrode for receiving a reset signal for resetting the switch controller;
a comparator having an inverting terminal for receiving the feedback voltage and a non-inverting terminal coupled to a first terminal of the capacitor; and
a flip-flop having a reset terminal for receiving the reset signal and a set terminal for receiving an output signal of the comparator, and for generating the soft start finish signal according to the reset signal and the comparator's output signal.

21. The converter of claim 20, the current source array unit comprising a plurality of current sources, configured to output currents of the current sources according to a level of the first voltage, and to output the currents of the current sources corresponding to the soft start finish signal.

22. The converter of claim 9, wherein
the energy transfer element is a transformer, and the switch is coupled to a primary side coil of the transformer.

23. The converter of claim 9, wherein
the energy transfer element is an inductor, and a first terminal of the switch is coupled to the inductor.

* * * * *